United States Patent [19]

Brooks et al.

[11] 3,805,245

[45] Apr. 16, 1974

[54] I/O DEVICE ATTACHMENT FOR A COMPUTER

[75] Inventors: Everett G. Brooks; Nyles N. Heise; David O. Lewis; Glenn D. Pooler, all of Rochester, Minn.; Dean O. Zimmerman, Dunwoody, Ga.

[73] Assignee: International Business Machines Corporation, Armonk, N.Y.

[22] Filed: Apr. 11, 1972

[21] Appl. No.: 242,962

[52] U.S. Cl. .......................... 340/172.5, 235/61.1 R

[51] Int. Cl. ................................................ G06f 3/08

[58] Field of Search ...................... 340/172.5; 444/1; 235/61.6 R, 61.9 R

[56] References Cited

UNITED STATES PATENTS

| | | | |
|---|---|---|---|
| 3,303,476 | 2/1967 | Moyer | 340/172.5 |
| 3,328,566 | 6/1967 | Kinzie | 340/172.5 X |
| 3,585,601 | 6/1971 | Lahrson | 340/172.5 |
| 3,029,414 | 4/1962 | Schrimpf | 340/172.5 |
| 3,210,733 | 10/1965 | Terzian | 340/172.5 |
| 3,283,308 | 11/1966 | Klein | 340/172.5 |
| 3,293,612 | 12/1966 | Ling | 340/172.5 |
| 3,369,221 | 2/1968 | Lethin | 340/172.5 |
| 3,587,044 | 6/1971 | Jenkins | 340/172.5 X |
| 3,618,031 | 11/1971 | Kennedy | 340/172.5 |
| 3,524,970 | 8/1970 | Wang | 235/61.6 R |
| 3,675,209 | 7/1972 | Trost et al. | 340/172.5 |
| 3,706,074 | 12/1972 | McPherson et al. | 340/172.5 |

*Primary Examiner*—Paul J. Henon
*Assistant Examiner*—Melvin B. Chapnick
*Attorney, Agent, or Firm*—Keith T. Bleuer

[57] ABSTRACT

An attachment for attaching I/O devices to the central processing unit of a computer including a minimized amount of hardware and particularly including registers for holding data that is being transferred from the central processing unit to an I/O device or vice versa. The attachment preferably also includes interrupt control logic for obviating the necessity for continuous polling of the I/O devices. Other necessary control functions for servicing the I/O devices, such as for translating the customer's program I/O commands, initializing interrupt levels, keeping track of the progress of processing by the I/O devices and sensing when an I/O operation is completed are performed by an interpretive mode program contained in a dedicated portion of the memory of the central processing unit.

10 Claims, 29 Drawing Figures

I/O DEVICE ATTACHMENT FOR A COMPUTER

BACKGROUND OF THE INVENTION

The invention relates to attachment circuitry for attaching input/output (I/O) devices to an electronic computer.

For a computing machine to be effective, a means must be provided to both enter data and withdraw results. A modern computing system usually employs several devices to perform this input/output (I/O) function. Among these devices are keyboards, card readers, card punches, printers and disk files. To effectively employ these I/O devices, the computing system needs some means of controlling or attaching them. This control function provides for scheduling, timing, counting, data buffering, error detection, and many other functions depending on the particular I/O device involved.

There are several methods by which this I/O control may be accomplished. One common method employed by the International Business Machine System 360 is that of a standard I/O interface by means of which the central processing unit (CPU) provides a standard I/O channel that looks the same to all of the I/O devices. It is required that I/O devices attached by this standard interface provide a control unit (CU) to adapt variable I/O devices to the standard channel. This type of approach is used when a large number of unknown I/O devices may need to be attached. Because of the cost of the control unit (CU), it is often an expensive approach, especially for small systems.

When the I/O devices to be attached are limited in number and their characteristics are well known, it is possible to move much of the control unit (CU) hardware under the covers of the central processing unit. This scheme may be called "native attachment" and is the scheme used by the International Business Machines System/3. Because the CPU provides the power and assumes some of the CU functions, it is usually less expensive than the standard interface approach as used for example in the IBM System/360. It does, however, still require a considerable amount of control hardware for each I/O device being attached.

SUMMARY OF THE INVENTION

It is an object of the present invention to provide an attachment scheme whereby a limited number of I/O devices may be directly attached to a CPU with a minimum of interface hardware. With this scheme, most of the tasks usually performed by the channel and attachment or CU logic are performed directly by the CPU. This approach offers a considerable cost savings over the native attachment schemes being employed in the IBM System/3 computers. In addition, the scheme has the advantage in that operating programs written for the I/O devices attached in this manner also run on the natively attached devices in the IBM System/3, the attachment scheme of the invention therefore being invisible to the operating level programmer.

The object of the invention may be accomplished by dedicating a portion of the memory of the central processing unit to the control of I/O devices. This portion of memory contains fixed programs and is protected from being entered by the operating program. A user should have no need to modify this area of storage once it has been initially loaded.

Internal to the control portion of memory are two levels of programs. The higher level consists of supervisory programs (located in the dedicated part of memory) which provide branching to the lower level programs. The lower level programs (also located in the dedicated part of memory) are subroutines to monitor and control the various functions of the attached I/O devices. When the operating program reaches an I/O instruction, it will be decoded and "trapped" out to the supervisory portion of the dedicated area of memory. The supervisory program will establish which subroutine is required for the I/O instruction and branch to it. The subroutine will perform the required control operation or operations and branch back to the supervisor which in turn continues on with the operating program.

Input requirements for the I/O devices are handled in much the same manner as output instructions. When an I/O device requires service, it will generate an interrupt request. The operating program will be interrupted and branching will occur to an interrupt level supervisor program. The supervisor program will establish which device needs service and branch to the appropriate subroutine. When the routine is completed, a reverse procedure returns the system once again to the operating program. It is significant to note that both the supervisor and I/O subroutines may be written in the same machine language as the operating program.

As an example, an elementary card reader may be assumed to be attached using the attachment scheme of the present invention. When the operating program issues a "read" instruction, it will be trapped out to the I/O supervisor and read control subroutine which is in the dedicated portion of memory. The read control subroutine will test and store the status of the reader and will enable the reader interrupt circuitry before branching back to the supervisor and operating program. This enablement of the interrupt circuitry is due to the setting of certain latching mechanisms in the attachment of the invention. When the reader drive mechanism is in position to feed a document card, another latching mechanism in the attachment of the invention is set, and this in turn activates interrupt request circuitry. The operating or customer's program is then re-entered while the document card is fed and transported. The document card entering the read station of the reader will again generate an interrupt request and branching to the reader control program via the supervisor program will occur. Testing status of the program will set other latching mechanisms in the attachment of the invention, allowing a reader to generate interrupts. These interrupts are counted by the reader program to establish when a card column has entered the read station; and, at this time, the reader control program will gate the information read from a document into appropriate storage in the memory of the CPU as defined by the operating program. When all columns of the document have been so read, the control program in the dedicated portion of memory resets the above mentioned latching mechanisms generating interrupts, preventing further interrupts until additional read instructions are given.

DESCRIPTION OF THE PREFERRED EMBODIMENT

For the purpose of illustrating the present invention, an attachment D (See FIGS. 3A and 3B) for effectively connecting a document card punch C and a document card reader B with a CPU or central processing unit A will be disclosed. It will be understood that other I/O devices, such as some of those previously mentioned, might be used in lieu of the punch C and the reader B; however, the punch and reader are considered to be typical I/O devices useable with the attachment D of the invention, since one of these devices (punch C) receives data from the central processing unit A and the other device (reader B) supplies data to the central processing unit A.

Figure 1:
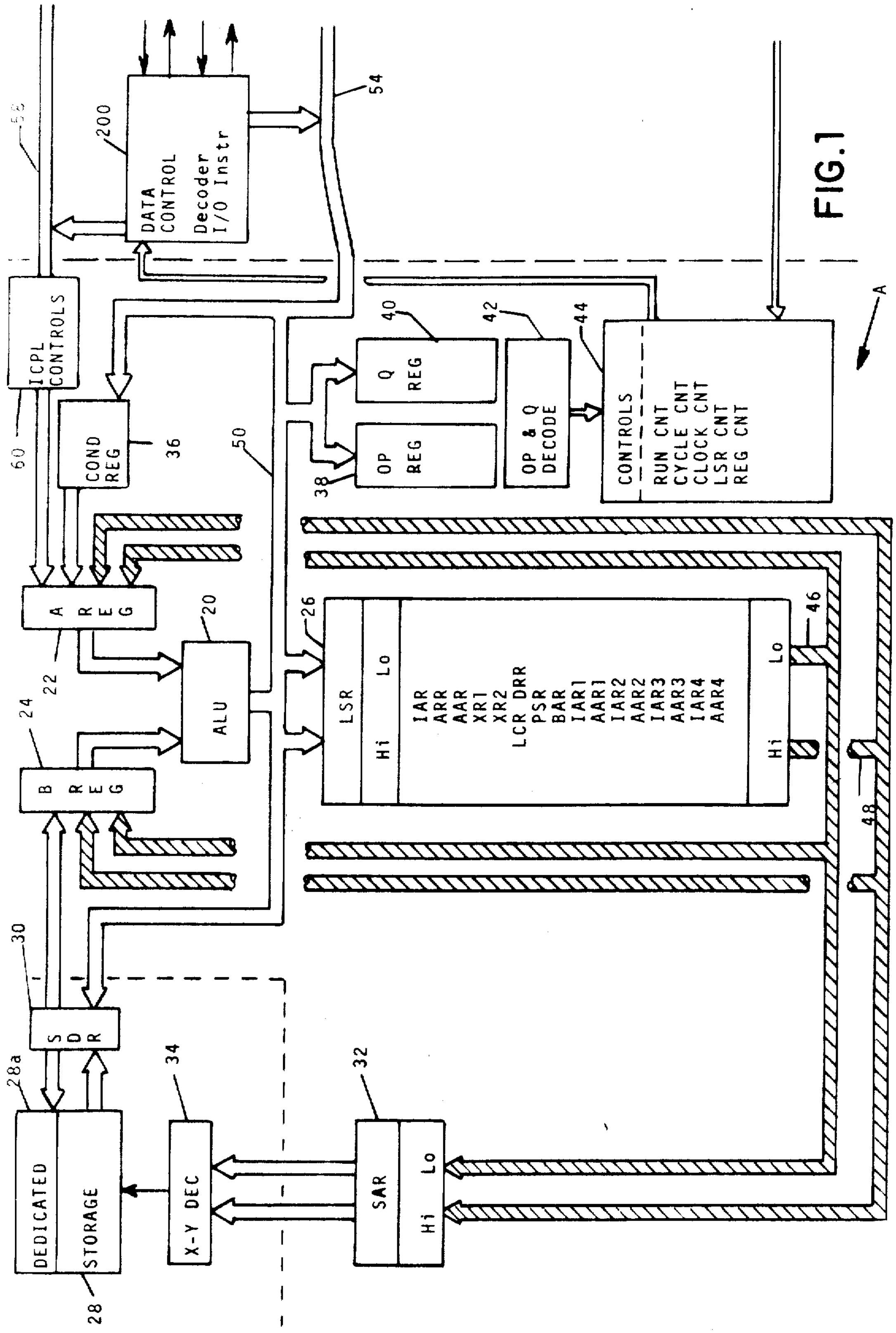
FIG. 1 is a diagrammatic illustration of a central processing unit that may be used with the I/O attachment of the invention and including an ICPL controls block of logic.

Although central processing units with varied connections and components may well be used with the attachment of D of the invention, the central processing unit A as illustrated in FIG. 1 is well suited for use with the attachment D. The central processing unit A illustrated in FIG. 1, may be seen to comprise an arithmetic and logic unit (ALU) 20, an A register 22, a B register 24, a bank of local store registers 26, a storage or memory 28, a storage data register 30, a storage address register 32, X–Y decode logic 34, a condition register 36, an OP register 38, a Q register 40, OP and Q decode logic 42, and controls 44. The local store registers 26 each have high and low sections (with 8 bits, for example, in each of the sections), and the low sections are connected by means of an output bus 46 with the A register 22, the B register 24, and the storage address register 32. The high sections of the local store registers are connected by means of an output bus 48 with the same registers 22, 24 and 32. The arithmetic and logic unit 20 has an output bus 50, and this bus is connected with the storage data register 30, the LSR's 26 and the condition register 36 as shown. Bus 50 is also connected with a data bus out (DBO) 54, and a data bus in DBI 58 is connected with the A register 22 through ICPL controls 60. Bus 50 is also connected with the OP and Q registers 38 and 40, and OP and Q instruction information in registers 38 and 40 is decoded by decode 42 connected with the controls logic 44. Data both enters and leaves storage 28 by means of storage data register 30 which is connected to the B register 24, and addressing of information in storage 28 is accomplished from the storage address register 32 supplying information to the decode 34 which in turn controls storage 28.

More particularly with respect to the components of the central processing unit illustrated in FIG. 1, the arithmetic and logic unit 20 may, for example, be a single byte (8 bits) combinatorial logic unit which can perform decimal binary add-subtract and the logical and/or. The inputs to the ALU are the A and B registers 22 and 24, and the output of the ALU 20 may be the contents of the B register modified by the contents of the A register. In particular, the ALU 20 may be of the particular detailed construction as is described in the patent issued to Nicholas Mitrofanoff, U.S. Pat. NO. 3,596,074. The output of the ALU 20 can be directed to main storage 28 as store data, to the registers 36, 38 and 40 to control the processor, to the local store registers 26 for interim storage or to connected input/output devices through the DBO 54.

The general registers in the CPU as illustrated in FIG. 1, include the registers 38, 40, 36, 22, 24, and 32. These function briefly as follows:

The operation register 38 is used to store the current "operation mode" which may appear as the first byte (8 bits) within an instruction format. Subsequent interpretation of the OP register contents instructs the CPU to execute a given operation in accordance with instruction set specification.

The Q register 40 provides interim storage for the "Q" byte of an instruction format. The functional responsibility of the Q field is dependent upon the type of instruction issued. Generally the Q byte may contain information relative to operand field lengths, specify a local store register 26 to be operated on, specify branch conditions or contain an immediate operand.

The B register 24 functions as a single byte buffer between main storage 28 and the central processing unit A. Information fetched from main storage must pass through the B register. The B register is also the buffer for the base factors of the ALU 20.

The A register 22 functions as a single byte buffer between input/output devices and the central processing unit A. Input data from the input/output devices must pass through the A register 22. In addition, the A register acts as a buffer for the modifying factors of the ALU.

The storage address register (SAR) 32, functions as a storage register to which addresses in main storage 28 are transferred from the local store registers 26, and the main storage addresses are maintained in register 32 for storage cycle reference.

The condition register 36 contains testable conditions which are the result of instruction execution. For example, the equal, low, high and binary overflow conditions contained in register 36 reflect the result of executing the last instruction which affected these conditions. The decimal overflow or the test false condition is set by the first instruction which results in that condition and can be reset only by the branch on condition or jump on condition which tests them and by machine reset.

Various functions of the particular local store registers 26 will become hereinafter apparent; however, the particular local store register, program status register (PSR), contains the image of the condition register 36 for the specific program level. The program status register (PSR) is used to save and to initialize settings of condition register 36 for individual program levels. The LSR's 26 serve as binary half word address registers for addresses in storage 28, particularly for maintaining sequential instruction addresses, current operand addresses during instruction execution, and addresses of I/O interrupt routines for use in the interpretive mode control programs contained in the dedicated memory portion 28a (to be hereafter explained). The local store registers 26 also serve as index registers for address arithmetic and as "scratch pad" storage for data, length counts, and program conditions or status.

As another example of the usage of a local store register 26, the address recall register (ARR) may be considered. During branch operations, the branch to address in storage 28 is placed in the address recall register (ARR). At the end of an I-phase, which is a machine cycle of the instruction stream, particularly the last memory fetch of the instruction; the instruction address register (IAR), one of the local store registers 26, contains the address of the next sequential instruction. If branching occurs, the contents of ARR and IAR are interchanged — the branch to address replaces the address of the next sequential instruction, which is in turn stored in ARR. Incidentally, in all other operations, the IAR contains the address of the next sequential instruction at the end of the I-phase.

The basic addressable unit of information in storage 28 may be a byte composed of 8 data bits. One byte of information is available to the CPU for each access made of storage 28. As will be observed, there will be a dedicated portion 28a of storage 28; and, as will be hereinafter apparent, this portion is used for properly controlling the I/O devices which are used in connection with the central processing unit A taking the place of considerable hardware in prior structures.

Figure 2A:
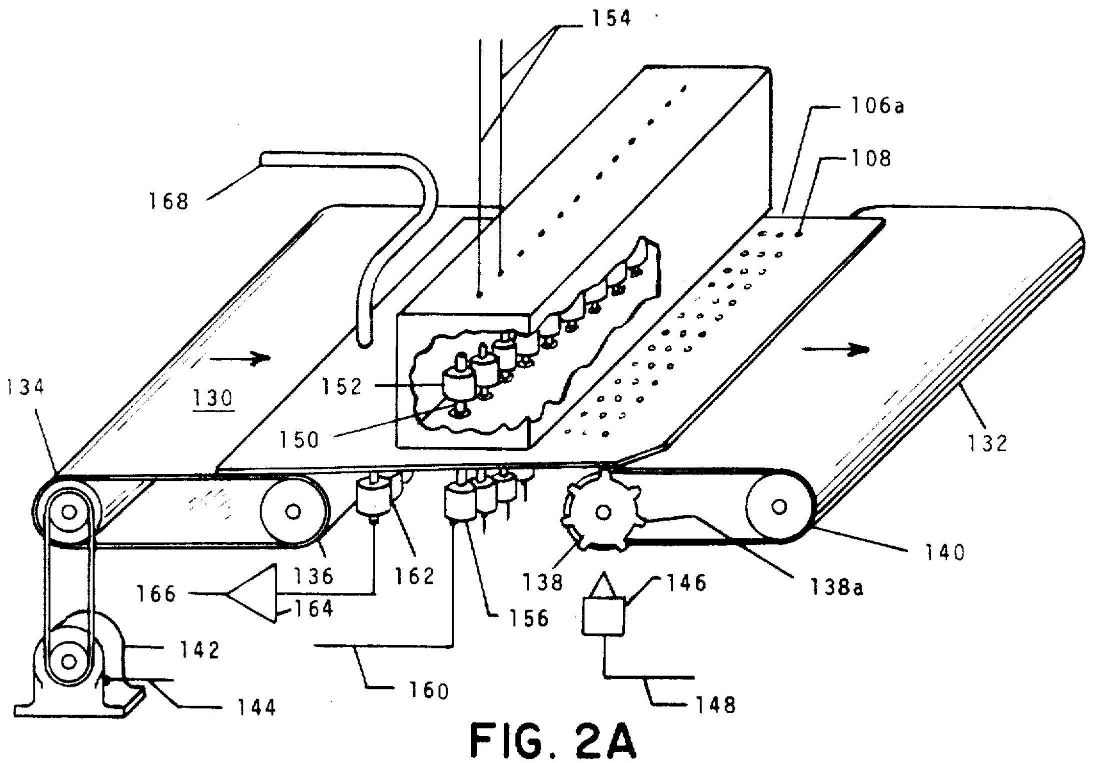
FIG. 2A is a diagrammatic illustration of a document card punch that may be used with the attachment.
Figure 2B:
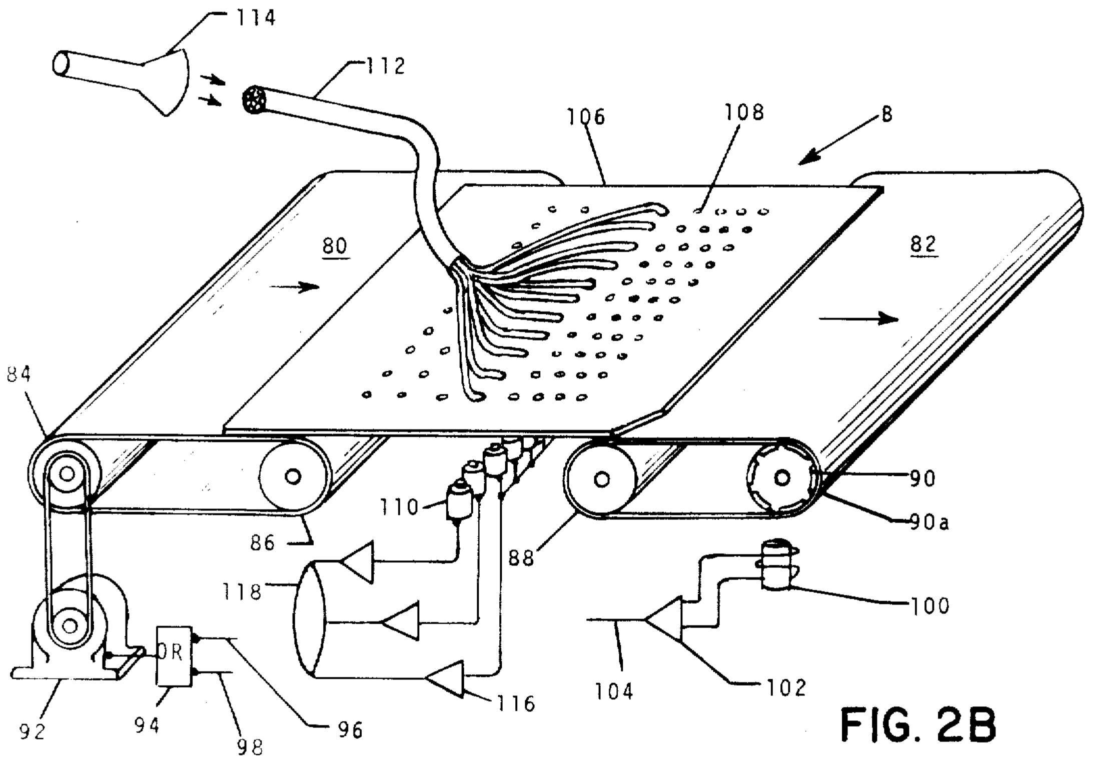
FIG. 2B is a diagrammatic illustration of a document card reader that may be used with the attachment.

The reader B is shown diagrammatically in FIG. 2B and may be seen to comprise a pair of endless belts 80 and 82 disposed over rolls 84, 86, 88 and 90. The belts 80 and 82 and rolls 84, 86, 88 and 90 are driven by means of an electric motor 92, and motor 92 is controlled through an OR circuit 94 from a "run motor" input line 96 and a "ICPL" (interpret control program load) input line 98. A magnetic detector 100 is disposed adjacent to the roll 90 which carries segments 90a of a magnetizable material so that electric pulses are induced in detector 100. Detector 100 is connected through an amplifier 102 with a "read emitter" output line 104.

The belts 80 and 82 are adapted to carry document cards 106 having holes 108 punched therethrough for carrying information. A series of phototransistors 110 is provided between the belts 80 and 82 and beneath a card 106 bridging the belts, and a fiber optic bundle 112 is disposed above the card 106 for the purpose of providing light to the phototransistors 110 through the holes 108. A light source 114 is provided at the end of bundle 112. Each of the phototransistors 110 is connected to an amplifier 116, and the outputs of these amplifiers are contained in a bus 118.

The punch C is shown diagrammatically in FIG. 2A and may be seen to comprise a pair of belts 130 and 132 movably mounted on rolls 134, 136, 138 and 140. The belts are driven from a motor 142 controlled from a "run motor" input line 144. A magnetic emitter 146 is disposed adjacent the roll 138 which is provided with a plurality of spaced projections 138a for producing electric pulses within the emitter 146. The emitter 146 has the output line 148 carrying the pulses in the form of a PUNCH EMITTER WHEEL signal.

A document card 106a is propelled by the belts 130 and 132, and a plurality of punches 150 are provided between the belts 130 and 132 for the purpose of punching holes 108 through the card 106a. Each of the punches 150 is actuated by means of an electromagnet 152, and the electromagnets are connected to an input bus 154. A plurality of punch check crystals 156 are disposed beneath the punches 150, and these are connected to an output bus 160. A phototransistor 162 is provided beneath the card 106a when the card 106a is in its illustrated position, and phototransistor 162 is connected through an amplifier 164 with an output line 166 carrying the signal PRE-PUNCH CELL. A fiber optic bundle 168 is positioned to terminate just above the phototransistor 162 and is provided with light on its upper end from any suitable source so that the photo transistor 162 is energized when the card 106a passes from its illustrated position farther in the direction of the arrows.

Figure 3A:
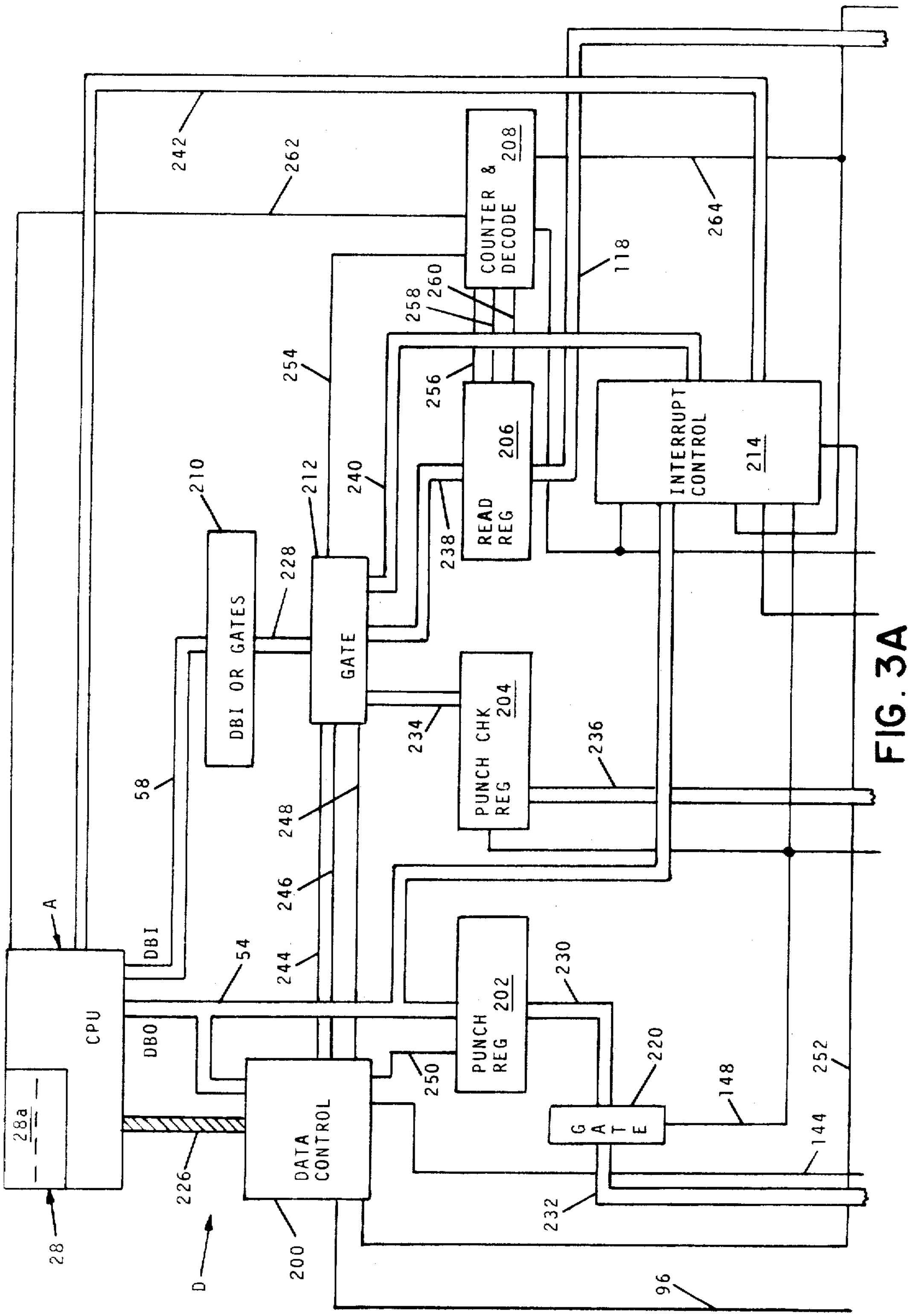
FIGS. 3A and 3B (with FIG. 3A placed above FIG. 3B) constitute a diagrammatic illustration of the I/O device attachment of the invention and including interrupt control logic, certain gates, a punch check register, a read register, a punch register, and a data control logic block.
Figure 3B:
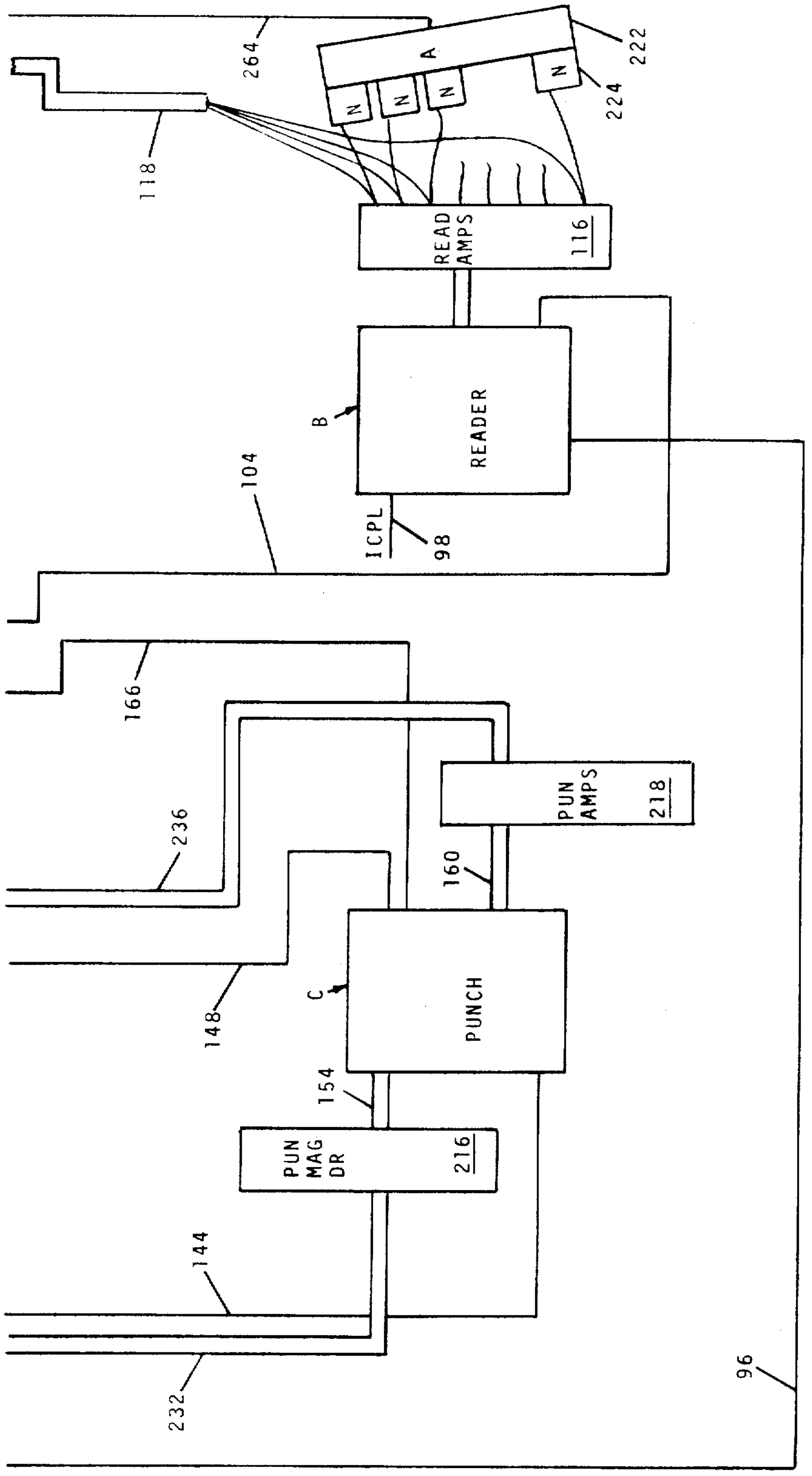

Referring to FIGS. 3A and 3B, the attachment D functions to interconnect the central processing unit A with the reader B and the punch C. The attachment D comprises data control logic 200, a punch register 202, a punch check register 204, a read register 206, counter and decode logic 208, DBI OR gates 210, a gate 212, interrupt control logic 214, punch magnet drivers 216, punch check amplifiers 218, a gate 220, an AND circuit 222, and a plurality of inverters 224 appended to the AND circuit 222.

The data control logic 200 is connected by a data out control bus 226 with the central processing unit A and particularly with the controls section 44. The DBO 54 is connected with the punch register 202 and the interrupt control logic 214 and the DBI 58 is connected with the DBI OR gates 210 which in turn are connected by a bus 228 with the gate 212. The punch register 202 is connected by means of a bus 230 with a gate 220, and the gate 220 is connected by means of a bus 232 with the punch magnet drivers 216 which in turn are connected with the bus 154. The gate 212 is connected by a bus 234 with the punch check register 204 which in turn is connected to the amplifiers 218 by means of a bus 236. The bus 118 is connected to the read register 206 which in turn is connected by a bus 238 with the gate 212. The interrupt control logic 214 is connected by means of a bus 240 with the gate 212, and the control logic 214 is connected by means of a bus 242 with the central processing unit A.

Various control lines also connect various components of the attachment D together. The data control logic 200 is connected by means of load punch check lines 244, load interrupt status lines 246 and load read data lines 248 with the gate 212. Load punch data lines 250 connect the data control logic 200 with the punch register 202, and allow load interrupt lines 252 to connect the data control logic 200 with the interrupt control logic 214. The run motor line 144 connects the data control logic 200 with the punch C. The ICPL count lines 254 connect the gate 212 with the counter and decode 208. Read count lines 256, 258 and 260 connect the read register 206 with the counter and decode 208. An ICPL control line 262 connects the counter and decode 208 with the central processing unit A. A read cells dark control line 264 is the output of AND circuit 222 and is connected with the decode 208 and interrupt control logic 214. Read emitter line 104 is connected to the logic 214 and also to the counter and decode 208. The two run motor lines 96 and 144 are connected to the data control 200. The line 166 carrying the PRE-PUNCH CELL signal is connected between the punch C and the interrupt control logic 214. The line 148 carrying the signal PUNCH WHEEL EMITTER connects the punch C with the gate 220 and with the punch check register 204.

Figure 10:
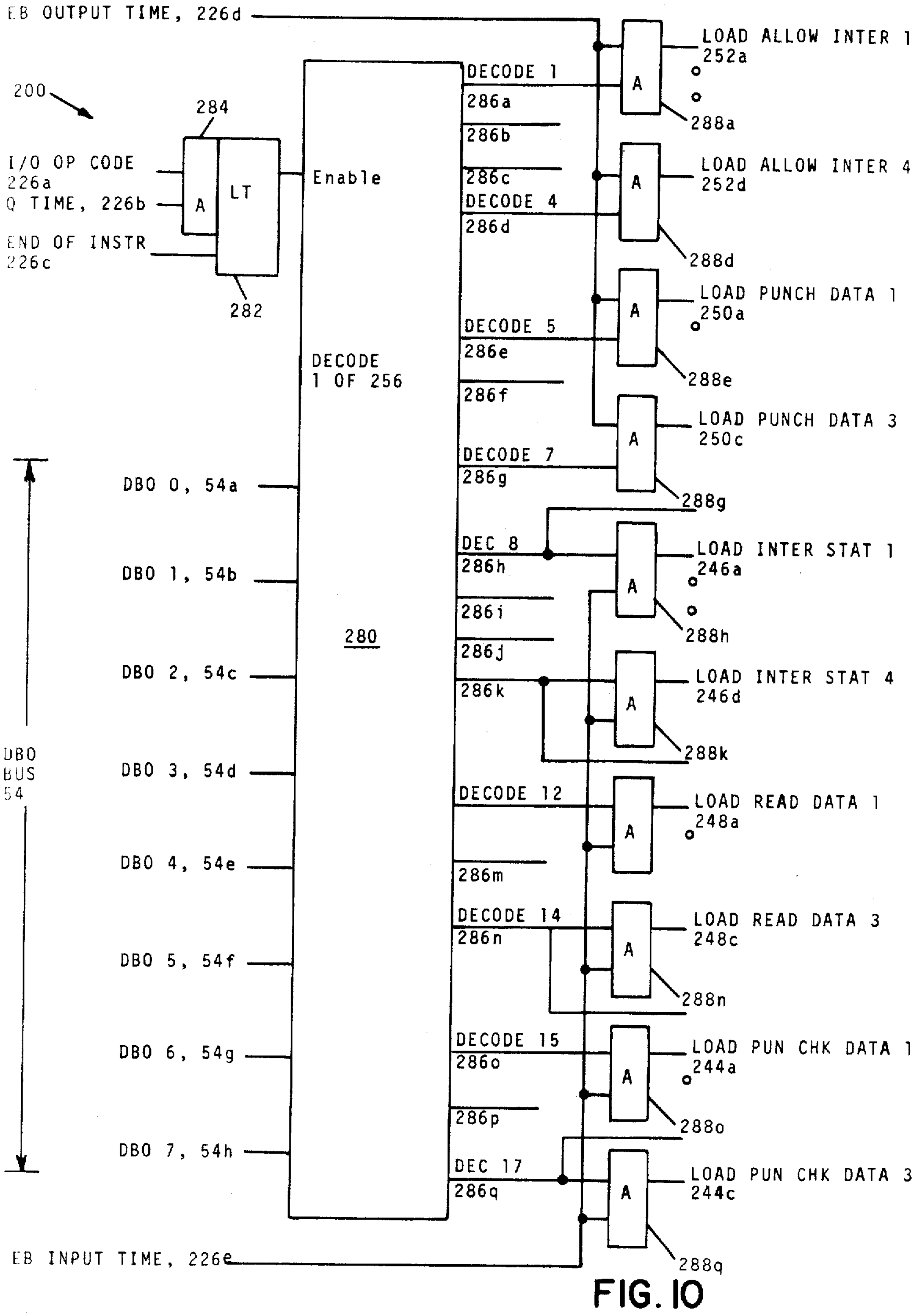
FIG. 10 is a more detailed schematic showing of the data control logic.

Referring to FIG. 10, the data control logic 200 may be seen to comprise a decode 280 which has the DBO 54 connected to it as an input. The decode 280 is controlled by a latch or flip flop 282, and latch 282 is controlled by an AND circuit 284 on its set side. The line **226*a* carrying the signal I/O OP CODE and line 226*b* carrying the signal Q TIME are applied to the AND circuit 284 as inputs. The reset side of the latch 282 has the line 226*c* carrying the signal END OF INSTRUCTION applied to it. The lines 226*a*, 226*b* and 226*c* are parts of the bus 226. The DBO 54 includes eight lines, 54*a* to 54*h*, all of which are applied to the decode 280; and these lines respectively carry DBO0, DBO1, DBO2 . . . DBO7 bits. The decode 280 has 17 output lines, carrying the signals DECODE 1, DECODE 2 . . . DECODE 16 and DECODE 17, respectively designated as lines 286*a*, 286*b*, 286*c* . . . 286*q*. The decode 280, having the eight input lines 54*a* to 54*h* and corresponding eight bits of input, is of any suitable construction so that these eight bits may be decoded into 256 combinations at "Q Time" and held until "End of Instruction Time". Actually decode 280 uses only a relatively few of the 256 combinations; and may, for example, with only a reader B and a punch C as output devices, use only 17 of these combinations. One of the output signals, DECODE 1, DECODE 2, etc. on the respective output line 286*a*, 286*b***, etc. is raised for each of these 17 combinations.

The output lines **286*a*, 286*b* . . . 286*q* are respectively connected with AND circuits 288*a*, 288*b* . . . 288*o* and 288*q*. It will be understood that, for simplification, of illustration, only some of these AND circuits, namely 288*a*, 288*d*, 288*e*, 288*g*, 288*h*, 288*k*, 288*l*, 288*n*, 288*o* and 288*q* are illustrated in FIG. 10, but there is one of these AND circuits for each of the output lines 286*a* to 286*q*. In addition to the output from the decode 280 applied as an input to these AND circuits 288*a* to 288*q*, these AND circuits also have the signal EB OUTPUT TIME applied to them as inputs on line 226*d*. The line 226*d* is part of the bus 226, and this signal is up when the central processing unit A has valid data on the DBO line 54** available for the attachment D.

Figure 4:
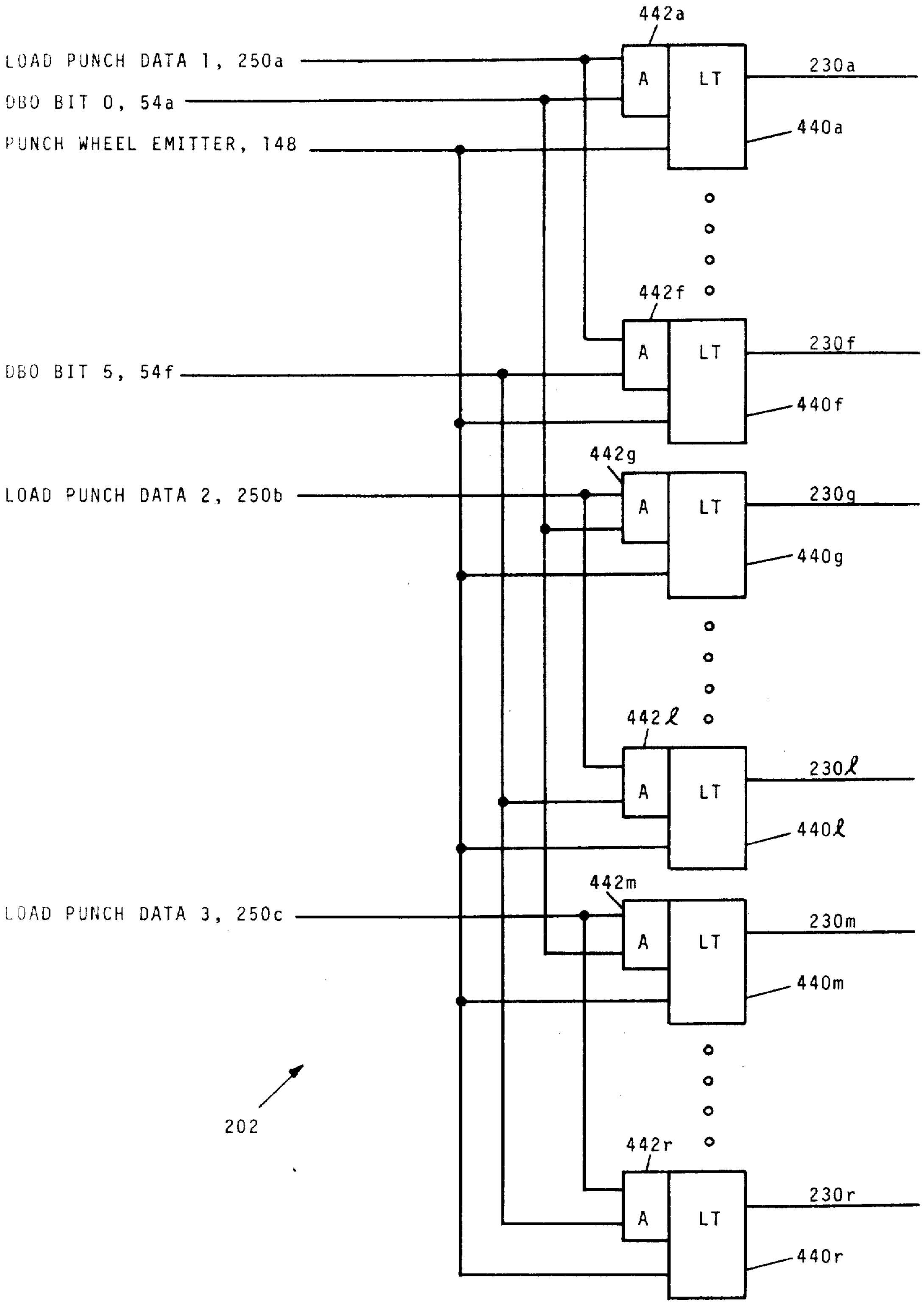
FIG. 4 is a more detailed schematic showing of the punch register.

The AND circuits **288*a* to 288*d* respectively provide the LOAD ALLOW INTERRUPT 1, 2, 3 and 4 signals on lines 252*a* to 252*d* which make up the lines 252 as shown in FIGS. 3A and 3B. The AND circuits 288*e* to 288*g* provide the LOAD PUNCH DATA 1–3 signals on lines 250*a* to 250*c* which make up the lines 250 as illustrated in FIGS. 3A and 3B. The AND circuits 288*h* to 288*k* provide as outputs the LOAD INTERRUPT STATUS 1–4 output signals on lines 246*a* to 246*d* which make up the lines 246 as shown in FIGS. 3A and 3B. AND circuits 288*l* to 288*n* provide output signals LOAD READ DATA 1–3 on lines 248*a* to 248*c* making up the lines 248 as shown in FIG. 3. The AND circuits 288*o* to 288*q* provide the output signals LOAD PUNCH CHECK DATA 1–3 on lines 244*a* to 244*c* making up the lines 244 as shown in FIG. 4**.

Figure 9:
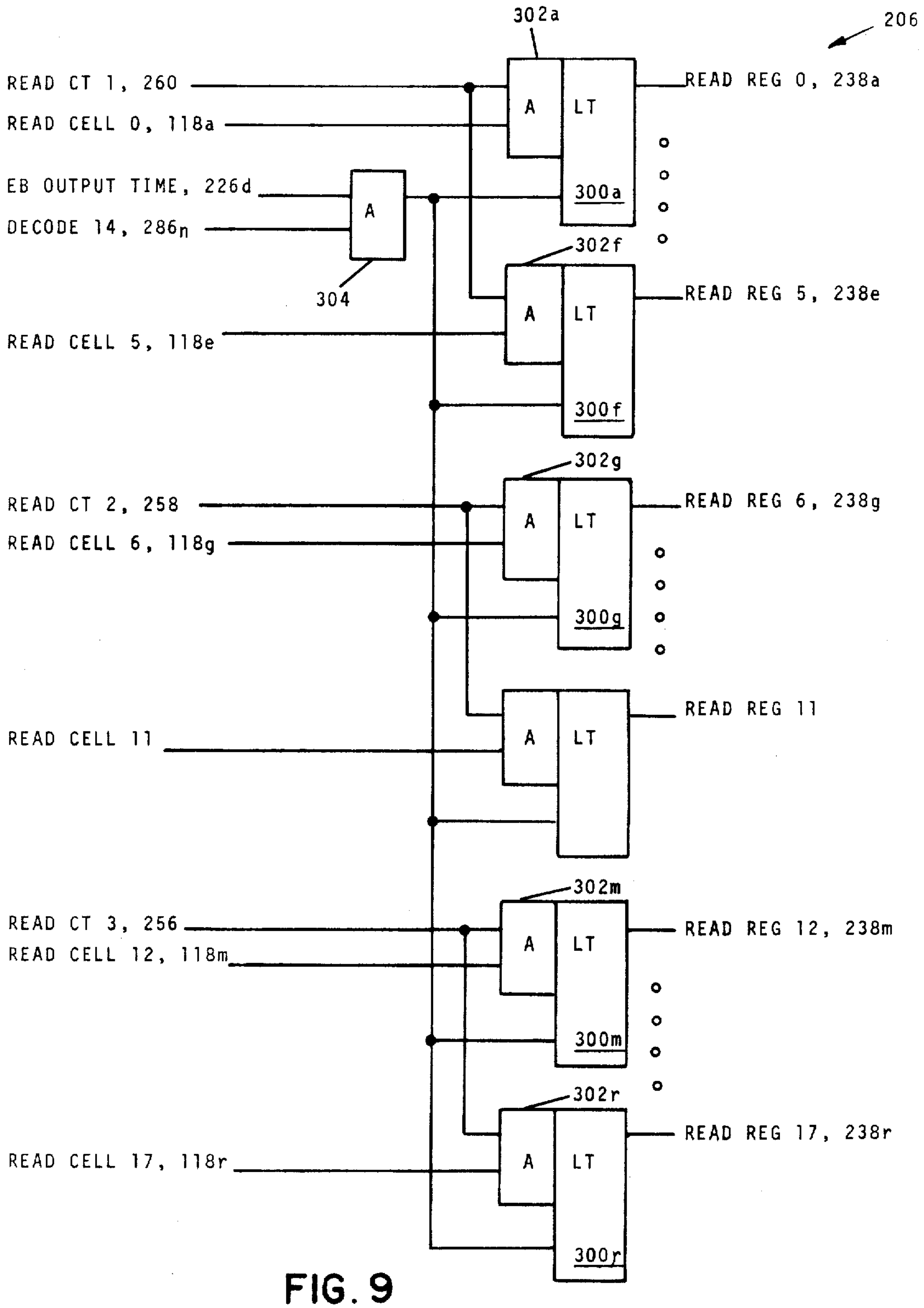
FIG. 9 is a more detailed schematic showing of the read register.

Referring to FIG. 9, the read register 206 may be seen to comprise latches **300*a* to 300*r*. It will be understood that, even though only certain ones of these latches are illustrated, such as the latches 300*a*, 300*f*, 300*g*, 300*l*, 300*m* and 300*r*, the others of the latches in the series, such as latches 300*b*, 300*c*, 300*d* etc. do exist and are omitted from the FIG. 9 showing only for the purpose of simplicity. Each of these latches 300*a* to 300*r* has an AND circuit on its set side, these respectively being AND circuits 302*a* to 302*r* for the latches 300*a* to 300*r*. The AND circuits 302*a* to 302*r* respectively have the lines 118*a* to 118*r* applied as inputs, these lines respectively carrying the signals READ CELL 0 to READ CELL 17. There may be eighteen of the holes 108 in a column of a card 106; and there are accordingly 18 of the read cells 110, with each of the read cells 110 producing one of the signals READ CELL 0 to READ CELL 17 on lines 118*a* to 118*r*. The AND circuits 302*a* to 302*f* also have the line 260 connected to them as inputs, and this line carries the signal READ COUNTER 1. The AND circuits 302*g* to 302*l* also have the line 258 applied to them as inputs, and this line carries the signal READ COUNTER 2. The AND circuits 302*m* to 302*r* also have the line 256 applied to them as inputs, and this line carries the signal READ COUNTER 3. An AND circuit 304 has its output applied to each of the latches 300*a* to 300*r*, and AND circuit 304 has input lines 226*d* and 286*n*. The line 226*d* is part of the bus 226** and carries the signal EB OUTPUT TIME which is up during the time in which the central processing unit A has valid data on the DBO 54 available for the attachment. The line 286n, as previously described, carries the signal DECODE 14 from the decode 280. The latches 300a to 300r respectively carry the output signals READ REGISTER 0 to READ REGISTER 17 which are carried respectively on line 238a to 238r constituting parts of the bus 238.

Figure 8:
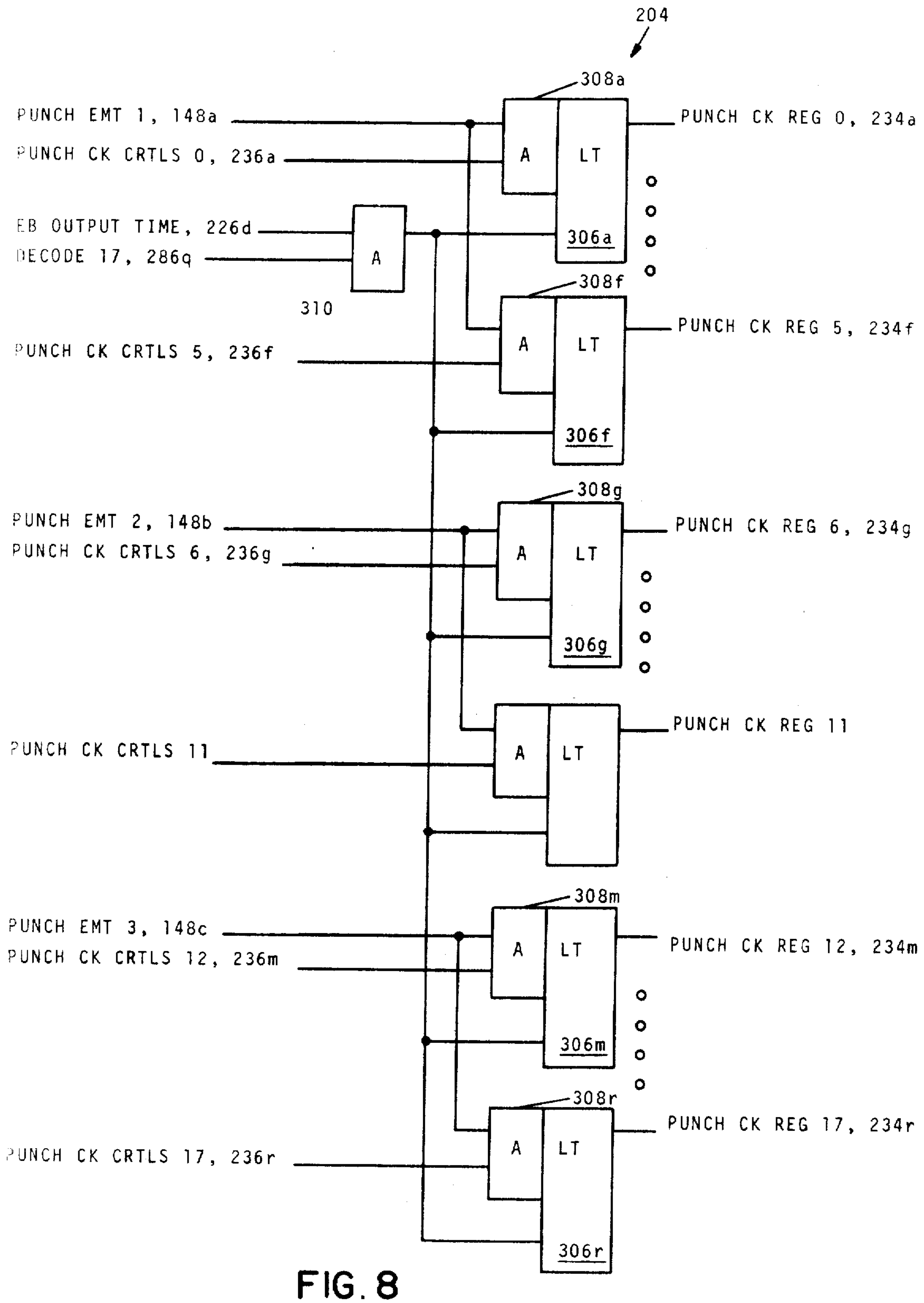
FIG. 8 is a more detailed schematic showing of the punch check register.

Referring to FIG. 8, the construction of the punch check register 204 may be seen to be very similar to that of the read register 206. The punch check register 204 includes latches 306a to 306r having AND circuits 308a to 308r appended to them on their set sides. PUNCH CHECK CRYSTAL signals on lines 236a to 236r are respectively applied to the AND circuits 308a to 308r. The PUNCH EMITTER 1 signal on line 148a is also applied as an input to AND circuits 308a to 308f; punch emitter line 148b is similarly applied to AND circuits 308g to 308l; and punch emitter line 148c is similarly applied to AND circuits 308m to 308r. The output of an AND circuit 310 is applied on the reset sides of latches 306a to 306r, and AND circuit 310 has lines 226d and 286q applied to it as inputs. The line 226d is part of the bus 226 and carries the signal EB OUTPUT TIME which indicates the time when the central processing unit A has valid data on the DBO line 54 available to the attachment. The line 286q carries the DECODE 17 signal which is the output of decode 280 (see FIG. 10). The latches 306a to 306r respectively provide as outputs the signals PUNCH CHECK REGISTER 0 to 17 on lines 234a to 234r constituting parts of the bus 234.

Figure 6:
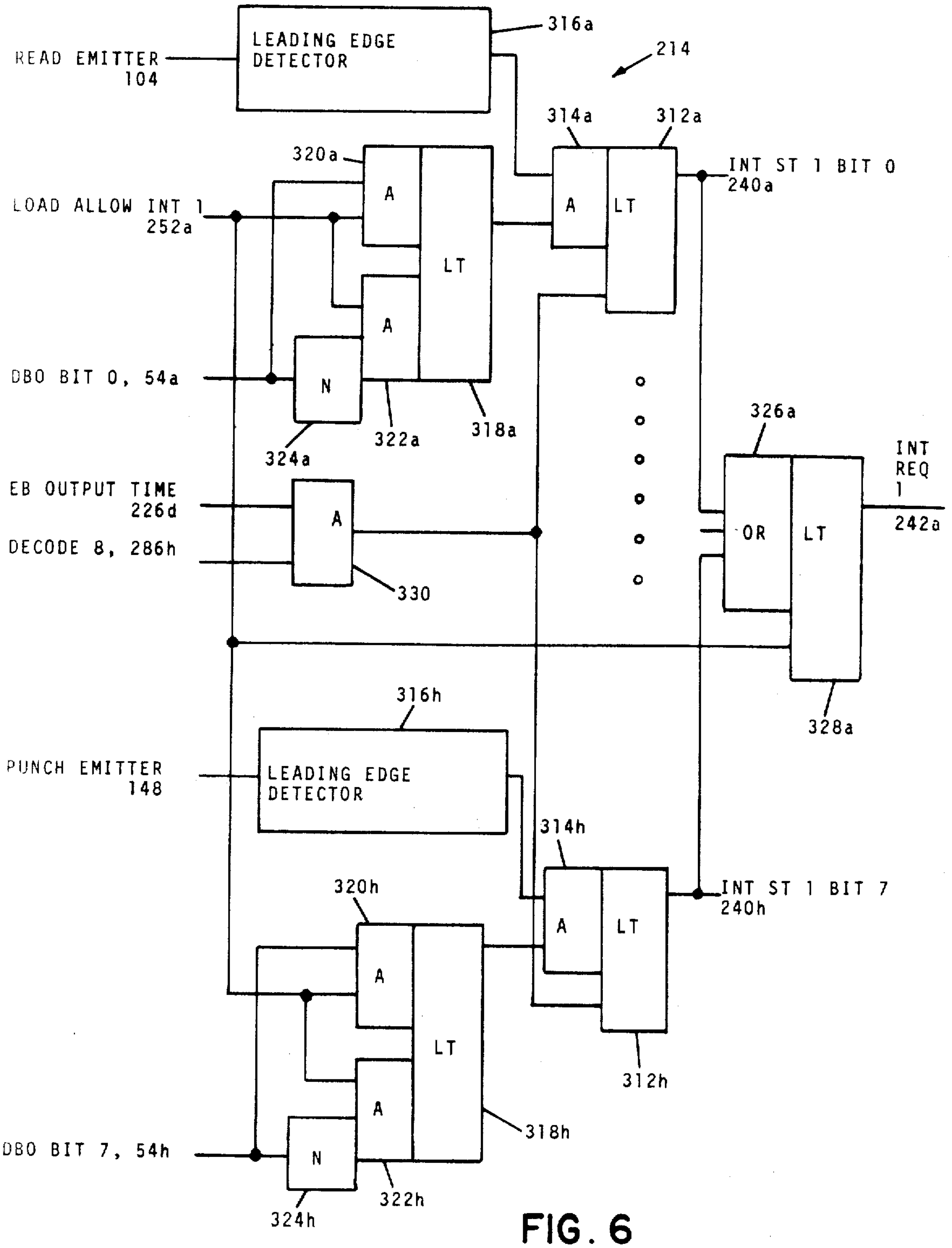
FIG. 6 is a more detailed schematic showing of the interrupt control logic.

Referring to FIG. 6, the interrupt control logic 214 may be seen to comprise a latch 312a having an AND circuit 314a on its set side. A leading edge detector circuit 316a has its output applied to the AND circuit 314a, as shown. A latch 318a has its output applied to the AND circuit 314a, and AND circuits 320a and 322a are applied on to the set and reset sides respectively of the latch 318a. An inverter 324a constitutes one of the two inputs to the AND circuit 322a. The signal LOAD ALLOW INTERRUPT 1 on line 252a is applied to the AND circuit 320a and to the AND circuit 322a. The signal DBO BIT 0 on line 54a is applied as an input to AND circuit 320a and to the inverter 324a, as shown. DBO 54 has 8 lines, bits 0 to 7; and the line 54a applied to inverter 324a carries the BIT 0 signal. The output of latch 312a is the signal INTERRUPT STATUS 1 BIT 0 on line 240a, and there are 8 lines in the bus 240 corresponding to these 8 bits, namely lines 240a to 240h.

FIG. 6 should be considered to include 8 each of the latches 312 and 318, AND circuits 314, 320 and 322, inverters 324 and detectors 316; however, there is only 1 each additional such shown in FIG. 6 for simplification. The connections between the various additional AND circuits, latches, detectors and inverters are the same as just described. The additional circuits for DBO BIT 7 carried by line 54h are illustrated and include the circuits 312h, 314h, 316h, 318h, 320h, 322h and 324h, and the output is the signal INTERRUPT STATUS 1 BIT 7 carried on line 240h. It will be understood that the intermediate circuits including latches 318b to 318g and latches 312b to 312g, not shown, with the DBO BITS 1 to 6 as inputs, respectively, have the outputs INTERRUPT STATUS 1, BITS 1 to 6 as outputs. The outputs of the latches 312a to 312h are applied onto an OR circuit 326a which in turn has its output applied onto the set side of a latch 328a. The reset side of latch 328a is connected to the line 252a carrying the LOAD ALLOW INTERRUPT 1 signal. The output of the latch 328a is the signal INTERRUPT REQUEST 1 which is carried on line 242a. The latches 312a to 312h are reset by a signal from an AND circuit 330 having the lines 226d and 286r applied thereto, these lines respectively carrying the signals EB OUTPUT TIME and DECODE 8.

The leading edge detector 316a is shown as having the READ EMITTER signal on line 104 applied to it as its input, and the leading edge detector 316h is shown as having the PUNCH EMITTER signal on line 148 applied to it as an input. The other intermediate circuits including latches 312b to 312g and latches 318b to 318g and the circuits appended thereto would be available for the application of signals comparable to the READ EMITTER signal or the PUNCH EMITTER signal from which an interrupt is desired. One such signal is the READ CELLS DARK signal on line 264.

Preferably, the central processing unit A has 4 levels of interrupt, and therefore, it is contemplated that the interrupt control logic 214 shall include three additional assemblages of circuits including all of the circuits considered to be included in FIG. 6, with each assemblage including 8 of the latches 312 and 8 of the latches 318. There are therefore four signals carried by the lines 252, namely, the LOAD ALLOW INTERRUPT 1, 2, 3 and 4 signals which would be on lines 252a, b, c and d. The bus 242 includes the interrupt request line 242a shown in FIG. 6 and, for the 4 levels of interrupt, would also include lines 242b, c and d carrying respectively the INTERRUPT REQUEST 2, 3 and 4 signals as an output of a latch 328. For these additional assemblages of circuits of the FIG. 6 type and included in the interrupt control logic 214; the outputs, in addition to the INTERRUPT REQUEST 2, 3 and 4 signals, would be the INTERRUPT STATUS 2, INTERRUPT STATUS 3 and INTERRUPT STATUS 4 signals on lines 240. The inputs to these additional assemblages of circuits of the type shown in FIG. 6 would be the DBO BIT 0 to DBO BIT 7 lines 54a to 54h, and lines 252 carrying LOAD ALLOW INTERRUPT 2, LOAD ALLOW INTERRUPT 3 and LOAD ALLOW INTERRUPT 4 signals. In lieu of the READ EMITTER signal on line 104 and PUNCH EMITTER signal on line 148 as inputs, one of the additional assemblages (for example, the interrupt request 2 assemblage) could have, for example, the READ CELLS DARK signal applied as one of its 8 inputs; and the interrupt request 3 assemblage could have the PREPUNCH CELL signal on line 166 as an input. The latter two signals would therefore have a different priority with respect to the READ EMITTER and PUNCH EMITTER signals insofar as generating an interrupt is concerned.

Figure 7A:
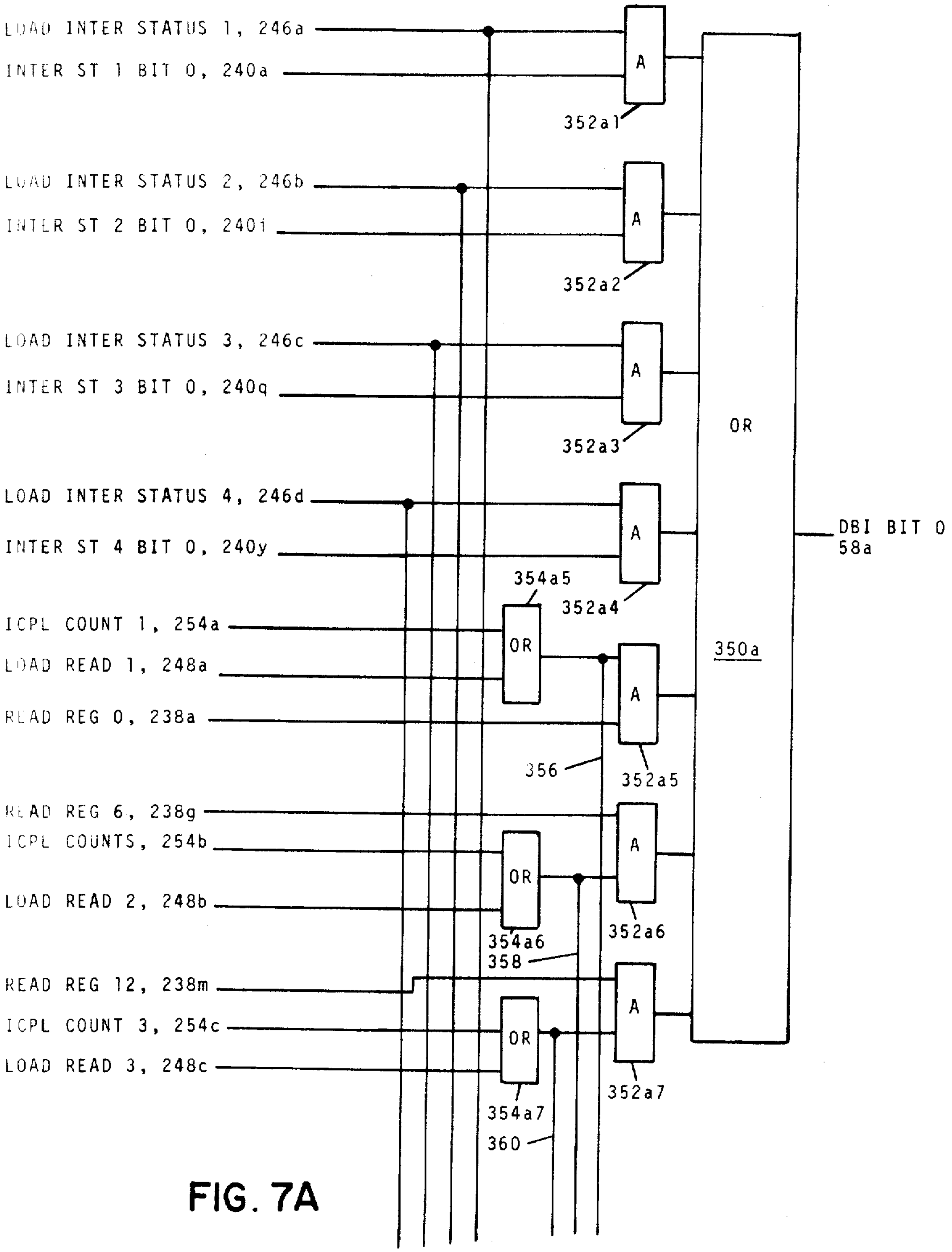
FIGS. 7A, 7B and 7C (with FIG. 7A being placed above FIG. 7B and with FIG. 7C being located below FIG. 7B) constitute a more detailed schematic showing of certain gates shown in FIGS. 3A and 3B.
Figure 7B:
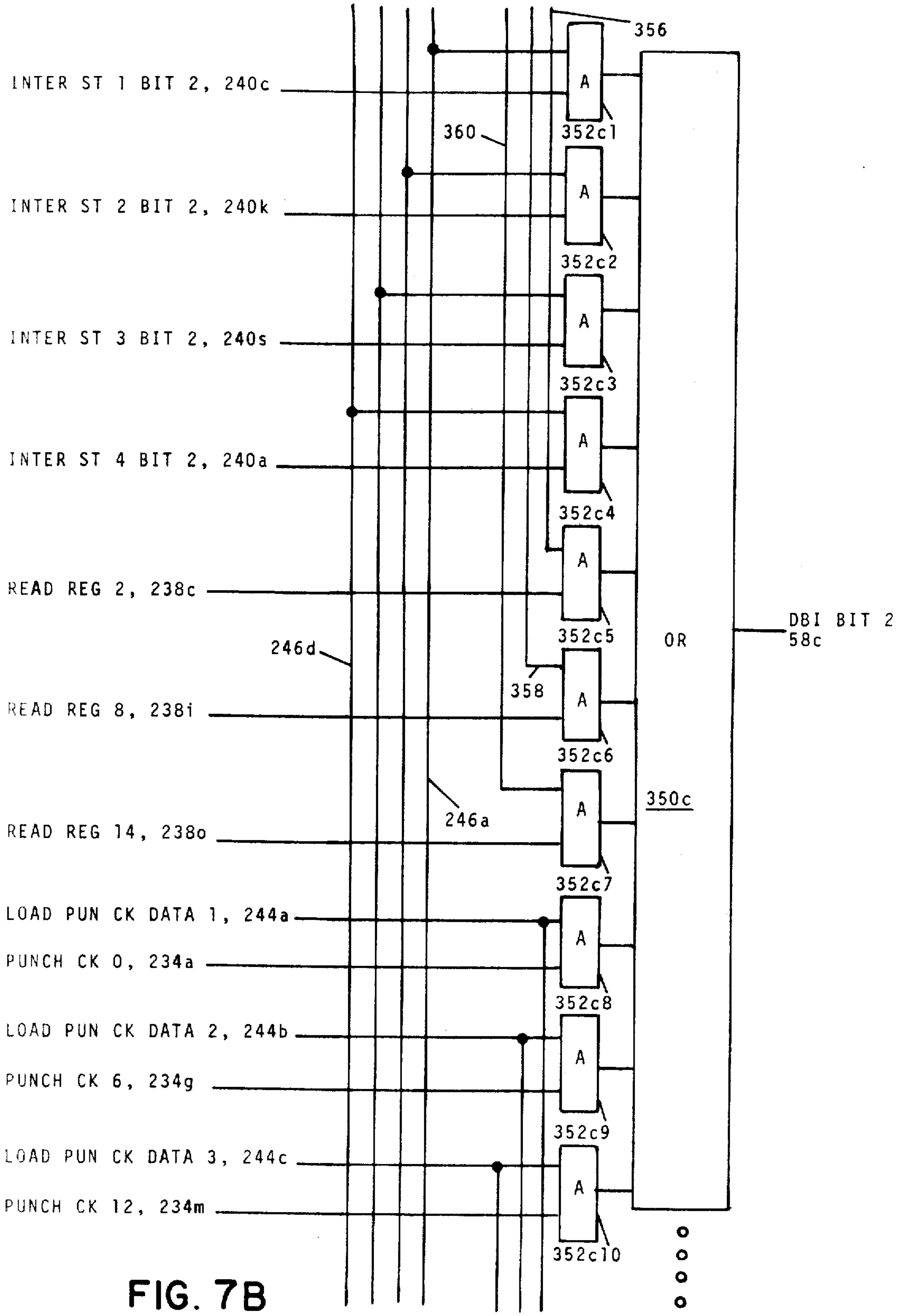
Figure 7C:
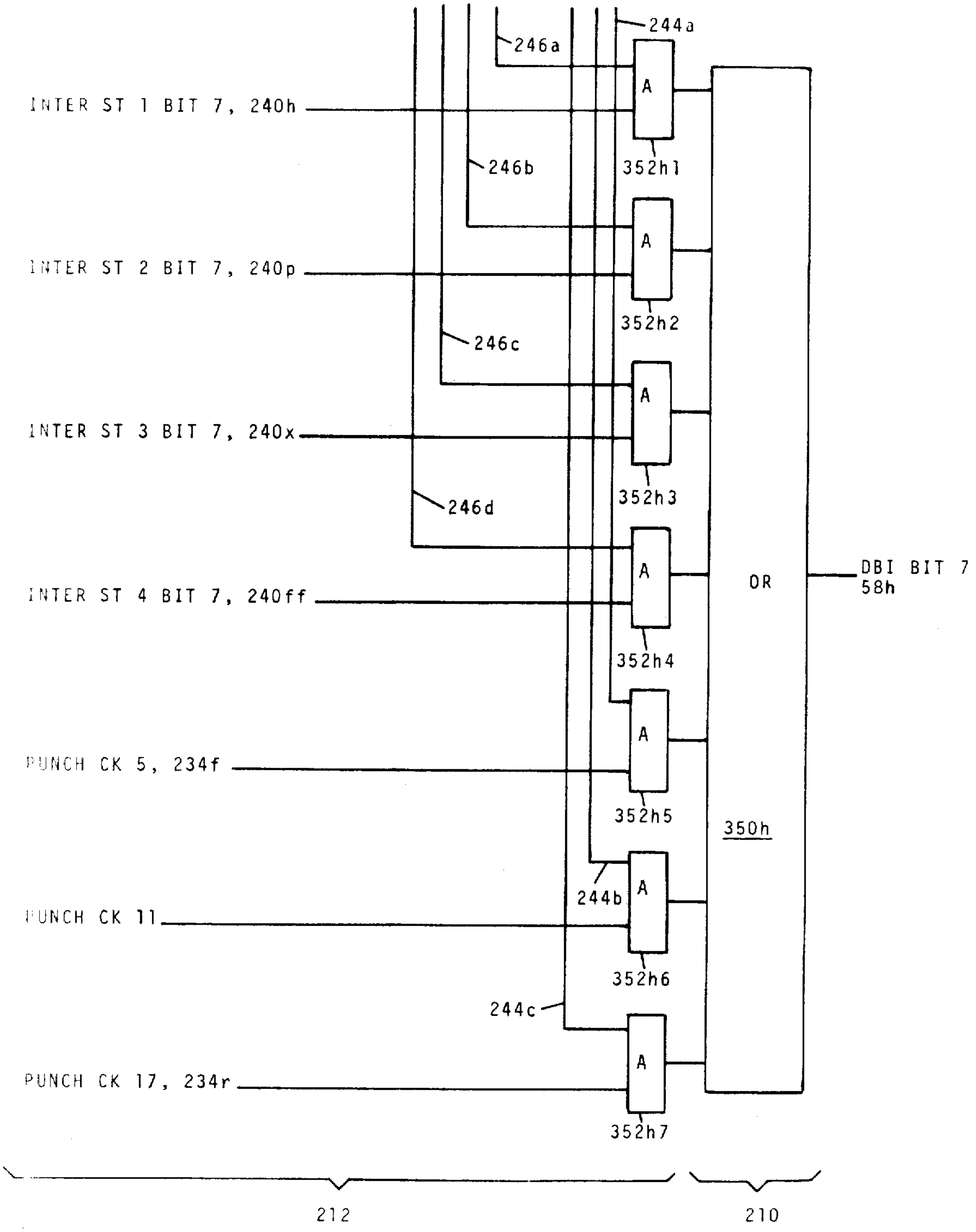

The DBI OR gate 210 is illustrated in some detail in FIGS. 7A to 7C. As previously described, DBI 58 includes 8 lines corresponding to bits 0 to 7. The OR gate 210 includes OR circuits 350a to 350h corresponding respectively to the 8 bits, and the outputs of these OR circuits are the DBI lines 58a to 58h. For the purpose of simplicity, only the circuits 350a, 350c and 350h are shown in FIGS. 7A to 7C, but the remainder of these OR circuits are similar to the three illustrated, as will be described.

The gate 212 is also shown in some detail in FIGS. 7A to 7C. The gate 212 includes AND circuits 352a1 to 352*a*7 each of which has its output connected to OR circuit 350*a*. Each of the other OR circuits 350*b* to 350*h* has corresponding AND circuits appended thereto, the OR circuit 350*c* having the AND circuits 352*c*1 to 352*c*10 appended thereto as shown, and the OR circuit 350*h* having the AND circuits 352*h*1 to 352*h*7 appended thereto.

The AND circuit 352*a*1 has as inputs the lines 246*a* and 240*a* both respectively carrying the signals LOAD INTERRUPT STATUS 1 and INTERRUPT STATUS 1 BIT 0. The AND circuits 352*a*2, 352*a*3 and 352*a*4 have corresponding inputs from lines 246*b* to *d* and 240*i*, 240*q* and 240*y* as shown.

The gate 212 also includes OR circuits 354*a*5, 354*a*6 and 354*a*7. The outputs of these OR circuits on lines 356, 258 and 360 are applied as inputs to the AND circuits 352*a*5, 352*a*6 and 352*a*7, respectively. The OR circuit 354*a*5 has the lines 254*a* and 248*a* respectively carrying the signals ICPL COUNT 1 and LOAD READ 1 as inputs, and the AND circuit 352*a*5 also has as an input the line 238*a* carrying the signal READ REGISTER 0. The OR circuits 354*a*6 and 354*a*7 have inputs corresponding to those of the OR circuit 354*a*5 which are lines 254*b* and 248*b* for circuit 354*a*6 and are lines 254*c* and 248*c* for OR circuit 354*a*7. The output of OR circuit 354*a*6 on line 358 is applied as an input to AND circuit 352*a*6, and this AND circuit has the additional input on line 238*g* carrying the signal READ REGISTER 6. The AND circuit 352*a* 7 has the additional input on line 238*m* carrying the signal READ REGISTER 12.

The AND circuits 352*c*1 to 352*c*10 all have their outputs applied as an input to the OR circuit 350*c*. AND circuits 352*c*1, 352*c*2, 352*c*3 and 352*c*4 have one of the inputs applied to the corresponding AND circuits for the OR circuit 350*a* above mentioned, namely, the signals on lines 246*a*, 246*b*, 246*c* and 246*d*. In addition, the AND circuits 352*c*1, 352*c*2, 352*c*3 and 352*c*4, have the signals INTERRUPT STATUS 1 BIT 2, INTERRUPT STATUS 2 BIT 2, INTERRUPT STATUS 3 BIT 2 and INTERRUPT STATUS 4 BIT 2 on lines 240*c*, 240*k*, 240*s* and 240*aa* applied as inputs. The following 3 AND circuits 352*c*5, 352*c*6, 352*c*7 have one of the inputs of the last three AND circuits for the OR circuit 350*a* applied thereto as inputs, namely, the signals on lines 356, 358 and 360. In addition, the AND circuits 352*c*5, 352*c*6 and 352*c*7 have the signals READ REGISTER 2, READ REGISTER 8 and READ REGISTER 14 respectively applied as inputs, these being carried on lines 238*c*, 238*i* and 238*o*. The AND circuit 352*c*8 has the lines 244*a* and 234*a* applied as inputs, these carrying the signals LOAD PUNCH CHECK DATA 1 and PUNCH CHECK 0 respectively. The AND circuit 352*c*9 has the input lines 244*b* and 234*g* which respectively carry the signals LOAD PUNCH DATA 2 and PUNCH CHECK 6. The AND circuit 352*c*10 has the input lines 244*c* and 234*m*, these respectively carrying the signals LOAD PUNCH CHECK DATA 3 and PUNCH CHECK 12.

The AND circuits 352*h*1 to 352*h*7, which have their outputs applied to the OR circuit 350*h*, each has an input also applied to an AND circuit just above mentioned. The AND circuit 352*h*1 has line 246*a* applied to it as an input and also has the input line 240*h* which carries the signal INTERRUPT STATUS 1 BIT 7. AND circuits 352*h*2, 352*h*3, and 352*h*4, respectively, have the corresponding lines 246*b*, 246*c* and 246*d* as inputs and, in addition, have the input lines 240*p*, 240*x* and 240*ff*, respectively, carrying the signals INTERRUPT STATUS 2 BIT 7, INTERRUPT STATUS 3 BIT 7 and INTERRUPT STATUS 4 BIT 7. The following 3 AND circuits 352*h*5, 352*h*6, 352*h*7 have the input lines 244*a*, 244*b* and 244*c* and, in addition, have the input lines 234*f* 234 , and 234*r* which respectively carry the signals PUNCH CHECK 5, PUNCH CHECK 11 and PUNCH CHECK 17.

The circuitry for DBI bit 1, which is not illustrated in FIGS. 7A to 7C, is identical with that for bit 0 and comprises 7 AND circuits corresponding to the AND circuits 352*a* feeding an OR circuit corresponding to the OR circuit 350*a*. The circuitries for DBI bits 3, 4 and 5 are each identical to that for DBI bit 2 which is shown in FIGS. 7A to 7C, and the circuitry for each bit includes an OR circuit corresponding to the OR circuit 350*c* and AND circuits corresponding to the AND circuits 352*c*. As will be noted, the circuitry for DBI bit 7 is identical with that for DBI bit 0, including the OR circuit 350*h* and AND circuits 352*h*; and the same is true for the circuitry producing DBI bit 6.

Figure 5:
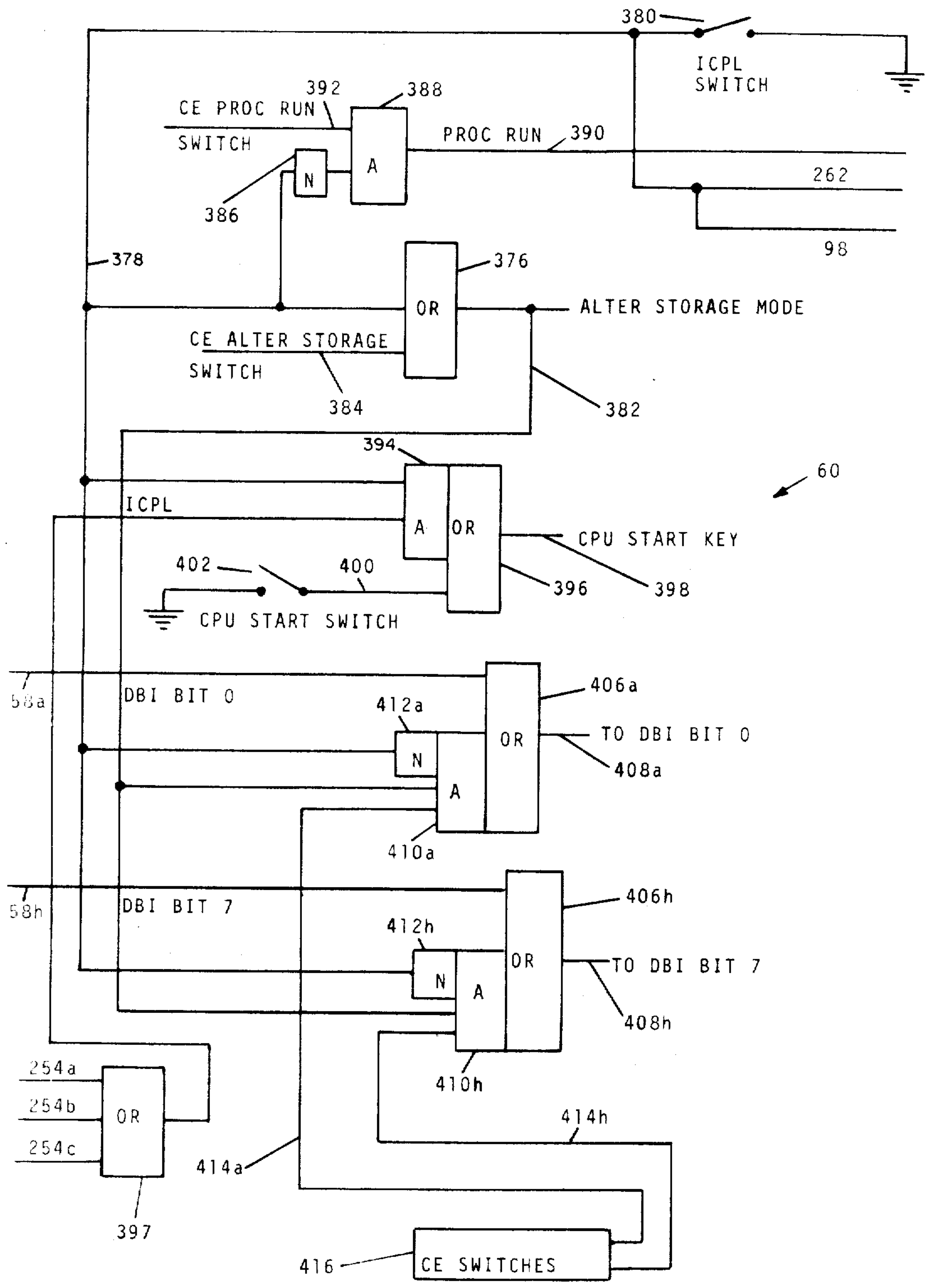
FIG. 5 is a more detailed schematic showing of the ICPL controls logic block.

The ICPL controls 60 are shown in some detail in FIG. 5. Referring to this figure, the ICPL controls include an OR circuit 376 having the line 378 as an input; and the ICPL switch 380 is connected to the line 378, as shown. The OR circuit 376 provides on its output line 382 the signal ALTER STORAGE MODE. OR circuit 376 has the additional input from line 384 which carries the signal CE ALTER STORAGE SWITCH. The line 378 is also applied through an inverter 386 as an input to an AND circuit 388. AND circuit 388 has an output line 390 carrying the signal PROCESSOR RUN, and AND circuit 388 has a second input in the form of line 392 carrying the signal CE PROCESSOR RUN SWITCH.

Line 378 is also applied as an input to an AND circuit 394 appended to an OR circuit 396. The second input to AND circuit 394 is the output of an OR circuit 397 having the input lines 254*a*, 254*b* and 254*c*. The output of OR circuit 396 is the line 398 carrying the signal CPU START KEY. Another input to OR circuit 396 is the line 400 connected to the CPU start switch 402.

The DBI BIT 0 line 58*a* is applied as an input to an OR circuit 406*a* having an output line 408*a*. An AND circuit 410*a* is applied on to OR circuit 406*a*, and the AND circuit 410*a* has the line 382 as one of its three inputs. The second input of AND circuit 410*a* is the output of an inverter 412*a* connected to line 378. The third input of AND circuit 410*a* is a line 414*a* connected to CE switches 416. The output line 408*a* carries the signal TO DBI BIT 0, and this is a continuation of the DBI BIT 0 line 58*a*. There are 7 additional OR circuits corresponding to the OR circuit 406*a* for the 7 additional bits in DBI 58, and the corresponding OR circuit 406*h* for bit 7 is also shown in FIG. 5. Likewise, for each of these additional OR circuits, there are auxiliary AND and inverter circuits corresponding to the circuits 410*a* and 412*a*. These auxiliary circuits for the OR circuit 406*h* are the circuits 410*h* and 412*h* illustrated in FIG. 5. The connections to the additional circuits corresponding to circuit 406*a*, 410*a* and for 412*a* are the same as those for the bit 0 circuit except that, in lieu of line 58*a* carrying the bit 0 information, the DBI lines for the other bits are used, such as the line 58*h* applied to OR circuit 406*h*. In addition, the information from the CE switches 416 for the particular bit under consideration is used in lieu of the line 414a containing the bit 0 information. The corresponding line for the bit 7 information from the CE switches 416 is the line 414h illustrated. The OR circuits corresponding to the OR circuit 406a carry the signal TO DBI BIT 2, TO DBI BIT 3 . . . TO DBI BIT 7.

Referring to FIG. 4, the punch register 202 may be seen to comprise latches 440a to 440r. For the purpose of simplicity, actual showings of the latches 440b to 440e, latches 440h to 440k and latches 440n to 440q are omitted. An AND circuit 442a is appended on the set side of the latch 440a, and a similar AND circuit is appended onto the set side of each of the other latches 440. The AND circuits 442f, 442g, 442l, 442m and 442r are actually illustrated. The AND circuits 442a to 442f all have the LOAD PUNCH DATA 1 signal on line 250a applied thereto; the AND circuits 442g to 442l all have the LOAD PUNCH DATA 2 signal on line 250b applied thereto; and the AND circuits 442m to 442r all have the LOAD PUNCH DATA 3 signal on line 250c applied thereto. AND circuits 442a to 442f respectively have the lines 55a to 55f carrying the signal DBO BIT 0 to DBO BIT 5 applied thereto, and the same signals are applied respectively to the AND circuits 442g to 442l and to the AND circuit 442m to 442r. The signal PUNCH EMITTER WHEEL on line 148 is applied to the reset sides of all th latches 440a to 440r. The output lines 230a to 230r are connected to corresponding lines 232a to 232r in the bus 232 when the gate 220 is open.

The central processing unit A illustrated diagrammatically in FIG. 1 is basically the same as the International Business Machines Model 3 Central Processing Unit now on the market. The present IBM System/3 uses an attachment for each I/O device, as previously explained, which includes a substantial amount of hardware for controlling the I/O device. With the attachment D of the present invention, substantially all of this hardware in the attachment is removed or obviated, and the I/O device control functions are taken over by the central processing unit A. With the present attachment D, the memory 28 of the central processing unit A and particularly the interpretative mode control program in the dedicated portion 28a of memory 28, is utilized for providing substantially the same I/O control that is provided by the hardware of the present IBM System/3 Processing Unit. Interrupt capabilities have, however, been retained in the attachment D in order that the interpretive program in memory 28 need not continuously monitor I/O output signals. The interrupt capability allows the processing unit A to go back to the operating or customer's program and accomplish the processing demanded by the customer's program while awaiting for the next significant event in I/O device processing. All functions are performed, as far as the customer is concerned, identically with the attachment D as with the attachment in the IBM System/3 which includes more hardware within the attachment.

The instruction set for the attachment D used in connection with the central processing unit A is substantially the same as that used in the present IBM System/3 except that 2 new instructions, "I/O output" and "I/O input" have been added. These two new instructions allow the same machine language used for the IBM System/3 to also be used with the present invention. In particular, the customer's control program makes use of these two new instructions to transfer data between the attachment D and the memory 28. The attachment D in this case simply adds a holding area for the bits that, for example, turn on the magnets 152 of the punch C. The interpretive control program, which is in memory portion 28a, differs from a normal System 3 customer application test program in that it causes the attachment D to sense when the customer's program has requested an I/O function rather than outputing the I/O command of the customer's program to an attachment. The attachment D actually traps data into the interpretive program, sets up the proper I/O interrupt, and outputs the proper bytes to the register latches in the attachment D in order to start the I/O process that the customer's program requests. Under interrupt control, the I/O process is monitored and controls the I/O process requested. When the process is completed, the contents of the dedicated memory portion 28a will also inform the customer's program that the I/O function is accomplished and that other I/O functions may be accomplished or that data then may be processed by the central processing unit A. As far as the customer is concerned, his program operates exactly the same as with the IBM System/3; and the interpretive program in memory portion 28a used in connection with the attachment D simply exists for the purpose of monitoring and performing the I/O functions.

With the attachment D, when an I/O instruction is initiated, the program in the dedicated portion 28a of the memory 28 decodes the I/O instruction to determine which of many of sequences of events with respect to the I/O devices shall be initiated. The initiation occurs by allowing an interrupt to intercede from the I/O device, for example, from the punch C. The punch C continuously puts out the punch emitter wheel signal on line 148; and these are applied, as will be observed from FIG. 3, to the punch check register 204 and the interrupt control logic 214. Since the interpretive mode program is dedicated memory portion 28a does not output any punch data and does not enable the interrupt, the punch wheel emitter signals on line 148 are not initially of any effect. However, when the interpretive mode program in memory portion 28 allows this interrupt (by the interrupt control logic 214), the next punch wheel emitter pulse on line 148 then controls interrupt control logic 214 and causes one of the interrupt request lines in bus 242 to be raised. However, before this occurs, the interpretive program had finished initializing the logic of the attachment D and its own storage in memory 28 (keeping track of the history of the I/O process); and, after the process is completed, the interpretive mode program returns the action back to the customer's program. At this point, the interpretive program is aware that a new pulse has been applied to the punch wheel emitter line 148 from the emitter 146, and the interpretive program then takes appropriate action. Early in the I/O action, the PUNCH WHEEL EMITTER signals on line 148 are simply used for timing the progress of a document card 106 in its path through the punch C. Later, when the card 106 actually reaches the punch area of the punch C, the interrupt controls the interpretive program to fetch the next three bytes of data from the customer's program and output these bytes to the punch register 202. This data in the punch register 202 then causes one or more of the punch magnets 152 to fire. After the interpretive control program has outputted one set of three bytes of punch information, it again returns control to the customer's or operating program, waiting for the next emitter pulse from the punch emitter 146 to initiate the sequence of outputting new data to the punch unit C.

Reading of a card 106 is accomplished in much the same way as a card 106 has been punched. As has been explained, while punching, concern was had with data being sent from the customer's program and assembled in the interpretive program and outputted to the I/O devices at the proper time; however, the read function is concerned with not only the card's position but also the data represented by the card. This data is transferred from the read cells 110 into the interpretive program and from thence it is stored into the customer's program. When a complete card 106 has been read by the reader B, the interpretive program in memory portion 28*a* signals the customer's program that the data so read can be used. This sequence of events is initiated by detecting a read I/O command in the customer's program, trapping it into the interpretive program, and outputting the various interrupt enable signals from the central processing unit A through the data control logic 200 into the interrupt control logic 214. The READ EMITTER signal on line 104 from the emitter 100 would be in control under these circumstances, particularly on the interrupt control logic 214. The interpretive mode program will return control back to the customer's program but branch back into the interpretive program every time the read emitter 100 requests an interrupt. When the interpretive control program has counted a sufficient number of read emitter pulses on line 104, to verify that the card 106 is within the read station area, it enables a read cell start interrupt, then waits for the card 106 to pass over the cells 110. At this point, the interpretive control program again initiates the counting of read emitter pulses from line 104, until the interpretive control program is again aware that the first column of the card 106 is over the read cells 110. At this point, the interpretive control program by means of the data control logic 200 causes the read data from the read cells to be retained in the read register 238, and this data is gated by means of gates 212 and 210 to DBI 58. The interpretive control program may thus in effect look at this data which is thus being supplied to the central processing unit A. The interpretive control program then stores the data in the customer's program and waits for the sequence of pulses from the read emitter 100 to indicate when it is time for the next card column to be read.

When the customer's program executes an I/O instruction, control must be transferred to the interpretive program in memory portion 28*a* to decode the instruction and perform the required functions. When the customer's program traps out, the locations of the I/O instructions are saved in the ARR register, which is one of the local store registers 26. The interpretive program then uses the contents of the BAR local store register to fetch the I/O instruction from the customer's program and to locate the position in the customer's program to which a return should be made after the initial selection of interrupt by the attachment to process the I/O signal. After this, all operations from the interpretive program are under interrupt control, and the normal interrupt hardware in the central processing unit A keeps track of the return location. The interrupt in the central processing unit A functions exactly the same as the interrupt in the IBM System 3 central processing unit, using the instruction address registers IAR, IAR 1, IAR2, IAR3, and IAR4 and the address recall registers ARR, ARR1, ARR2, ARR3, and ARR4. The IAR1–4 and ARR1–4 registers refer to the four levels of interrupt, these registers referring to program level being in addition to the IAR and ARR registers which have to do with the ordinary operation of the central processing unit.

More specifically, with respect to the central processing unit A and the instructions used, the central processing unit A, when operating in interpretive mode using the attachment D, uses all of the instructions that the customer's program of the IBM System/3 uses, with the exception of the I/O instructions. Instead of the customer's I/O instructions, the interpretive mode with the attachment D has as its own two instructions, "I/O input" and "I/O output". These preferably have a single address, non-branch format with the option of direct or indirect addressing. If indirect addressing is used, the XR1 and XR2 local store registers 26 are used. A single E–B cycle is used in both instructions to transfer a byte of data from the I/O attachment D. These instructions may be used only in the memory area 28*a* assigned to the interpretive program. In the customer's programs, five specific instructions are provided for the I/O devices, and these are: start I/O (SIO), sense I/O (SNS), load I/O (LIO), test I/O and branch (TIO), and advance program level (APL). The start I/O instruction initates the mechanical functions such as read, write, stacker control, forms control, etc. The sense I/O instruction trnasfers data from the I/O device to storage 28. The load I/O instruction transfers data from storage 28 to the I/O device. The TIO instruction provides the facility of branching as a result of testing I/O conditions. The advance program level instruction acts as a TIO instruction.

The central processing unit A includes the general purpose arithmetic and logic unit 20 which performs the functions above mentioned and also allows a flush through of data. The ALU 20 is fed from the A register 22 and B register 24. The central processing unit A, like the IBM System/3 central processing unit, includes a relatively large number of local store registers 26; and thse include the index registers XR1 and XR2, address registers, and status registers. The existence of these local store registers make the central processing unit A quite adaptable to I/O control using interpretive programs, without the extensive use of hardware in I/O attachments. The instructions coming from the I/O attachment D are transferred through the A register 22 to the ALU 20 and into the LSR registers 26, and from thence into the storage address register 32 and via SAR 32 to memory 28. Transfers out of memory 28 are through the storage data register 30, through the B register 24 to the ALU 20 and the transfer is then to DBO 54. The I/O control is quite standard in that the instructions are each broken down into an OP section and a Q section. The OP section indicates whether or not the instruction is an I/O instruction, and the Q section provides additional details of the operation to be performed. The OP code for the I/O devices for the present system amounts to only two, one for input and one for output. Practically, there may be no distinction between the two, since the hardware does not distinguish between them. This is true since the hardware, as will be hereinafter made more clear, only looks for an output at output time and only looks for an input at input time.

The controls 44 are quite conventional. The normal mode is the run mode in which every instruction is continuous with respect to the other instructions. The non-run areas are the instruction cycle mode or clock step mode in which the central processing unit A will execute either one clock for each depression of the start key, or one cycle for each depression of the start key; or, in instruction step mode, one instruction for each depression of the start key, with the exception that when an I/O instruction is encountered and if the machine is in either the cycle mode or the clock step mode, the central processing unit A will immediately go into the run mode as far as the controls to the I/O devices are concerned and as far as any operation in the interpretive program is concerned. However, the machine will remain at the same address in storage 28 in the customer's area of storage 28. The LSR control in register controls 44 are essentially signals that transfer data within the registers. If the machine is in any of the step modes; and, if an I/O instruction is then encountered, the central processing unit A will change into the run mode and go through the sequence of instructions but will stop at the end of the sequence. In an interpretive mode program (contained in memory section 28*a*), there is no instruction for a step mode allowed; and the machine is, for interpretive mode, always in the run mode. Therefore, whenever a return is made back to the customer's program, a return is made to the step mode if this mode is called for.

For a more specific description of the operation of the attachment, it may be assumed that the portion 28*a* of memory 28 contains all of the information and data to control the I/O devices which, in the particular example disclosed, are the punch C and reader B. This data may be loaded into the memory section 28*a* as will be subsequently described.

A more detailed description of the operation of the attachment D will now be given referring particularly to FIGS. 3A, 3B, 4 and 6 to 10. Information transferred between the I/O devices (the reader B and the punch C) on the one hand and the central processing unit A on the other hand is under the control of the data control logic 200 which is shown in detail in FIG. 10. In order to either input or output data from or to the attachment D, the I/O OP CODE line 226*a* raises, and shortly thereafter the Q TIME line 226*b* raises so as to thereby set latch 282 (see FIG. 10). This has the effect of enabling the decode 280 to decode the information on DBO 54 so as to select or raise a signal on one of a possible 256 decode output lines. Actually, in the present attachment, there are only the 17 decode lines 286*a* to 286*q*. For example, if the control program directs that certain interrupts on level 1 be allowed, it would cause the raising of a signal in certain of the DBO lines 54*a* to 54*h* under a predetermined code, and this could raise the DECODE 1 signal on line 286*a*. A short time later, the EB OUTPUT TIME line 226*d* has a signal raised thereon. Therefore, at this time, the AND gate 288*a* has its inputs satisfied, providing the signal LOAD ALLOW INTERRUPT 1 on line 252*a*. After EB OUTPUT TIME and later EB INPUT TIME signals have lowered, the last command in the instructions is effective to provide the signal END OF INSTRUCTION. The enable latch 282 is thus reset, effectively lowering all of the decode output lines of decode 280 until the next I/O cycle.

The effect of the LOAD ALLOW INTERRUPT 1 signal is to allow loading of interrupt level 1 data. The AND circuit 288*d* has the same effect with respect to interrupt 4 level; and the intermediate AND circuits not shown in particularity have the same effect with respect to the 2nd and 3rd interrupt levels. The lines 252*a* to 252*d* are applied onto the interrupt control logic 214 in which they cause latches 218 to be set, as will be described in greater detail hereinafter.

When others of the DBO lines 54*a* to 54*h* are raised, the output lines 286*e* to 286*g* carrying the signals DECODE 5, DECODE 6 and DECODE 7 are raised. These output signals, being applied to AND circuits 288*e* to 288*g* raise the LOAD PUNCH 1 to LOAD PUNCH 3 signals on lines 250*a* to 250*c* at the EB OUTPUT TIME. The LOAD PUNCH DATA lines allow selected punch data latches to accept data from DBO 54. In the punch register 202 as shown on FIG. 4, these are the latches 440.

The following decode signals, DECODE 8 to DECODE 11 respectively carried on lines 286*h* to 286*k*, along with the signal EB INPUT TIME on line 226*e*, are applied respectively to AND circuits 288*h* to 288*k* and satisfy these AND circuits to produce the signals LOAD INTERRUPT STATUS 1 to LOAD INTERRUPT STATUS 4 on lines 246*a* to 246*d*. One of these output lines is active at a time and gates the interrupt status lines from the interrupt control block 214 into DBI 58, as will be hereinafter more fully described.

The following decode signals, DECODE 12 to DECODE 14 carried on lines 286*l* to 286*n*, along with the signal EB INPUT TIME on line 226*e* can saisfy the AND circuits 288*l* to 288*n*. The signals LOAD READ DATA 1 to LOAD READ DATA 3 on lines 248*a* to 248*c* are thereby produced. These signals will allow read data to be gated from the read register 206 through the gates 210 and 212 through the DBI 58 to the central processing unit A. This action will be further explained in further detail in connection with a discussion of the read register 206.

The last three decode signals from the decode 280 are the DECODE 15 to DECODE 17 signals carried on lines 286*o* to 286*q*. These decode signals are applied to the AND gates 288*o* to 288*q* along with the signal EB INPUT TIME. The signals LOAD PUNCH CHECK DATA 1 to LOAD PUNCH CHECK DATA 3 on lines 244*a* to 244*c* are thereby raised. These signals gate punch check data from the punch check register 204 onto the DBI 58 in a similar manner as the read data was gated onto the DBI 58 as just described. This will be described hereinafter in greater detail in connection with a discussion of the punch check register 204.

The DECODE 8, 11, 14 and 17 signals have additional uses in resetting certain latches in the circuitry. The DECODE 8 signal on line 286*h* is used to reset the interrupt latches 312*a* to 312*h*; the DECODE signals 9, 10, and 11 on lines 286*i*, 286*j* and 286*k* perform the same resetting functions for the corresponding latches for the 3 other interrupt levels (circuitry identical with the FIG. 6 circuitry but for the other 3 levels); the signal DECODE 14 on lines 286*n* is also used to reset the read register latches 300*a* to 300*r*; and the DECODE 17 signal on line 286*q* is also used to reset the latches 206*a* to 306*r* of the punch check register 204.

With respect to the timing signals EB OUTPUT TIME, EB INPUT TIME, etc., these lines are raised under control of the central processing unit A. When central processing unit A executes an I/O instruction, there are 4 machine instruction times. The first time is termed "I/O op code" or operation time, and during this time the signal I/O OP CODE on line 266a is raised. The second time is termed "Q time" and during this time the Q TIME signal on line 266b is raised. The third time is termed "R time", and this time is not used by the attachment D but is used by the central processing unit A for modification of the information located during Q time. For the attachment D, the 8 bits occurring during Q time are sufficient for all transfers of data. The EB cycle occurs immediately after the R time. Depending on whether the EB cycle constitutes an input cycle or an output cycle, the EB INPUT TIME signal on line 226e will be used or the EB OUTPUT TIME signal on line 226d will be used. Because EB input time comes before EB output time, the attachment D uses the signal EB OUTPUT TIME to reset latches that have been sampled during EB input time.

Referring to a detailed showing of the punch register 202 in FIG. 4, it will be noted that the register basically includes 18 memory elements or latches 440a to 440r. These are used to hold the data that is to be punched into a card 106 after the interpretive control program outputs this data on DBO 54 and until the next PUNCH WHEEL EMITTER signal occurs on line 148 causing the latches 440a to 440r to be reset. In particular, it will be noted that the load punch data lines 250a, 250b and 250c derived from the data control logic 200 are applied onto the AND circuits 442a to 442r. These signals allow the latches 440a to 440r to be set with the DBO out bits carried on lines 54a to 54f. The output lines 230a to 230r are then in effect directly connected (through gate 220) to the punch driver magnets 152. The proper punches 150 then provide corresponding holes in the card 106a. This process is repeated for each new incremented position of the card 106a as it passes beneath the punches 150, for each new position of the wheel 138.

Referring to FIG. 8 that shows the punch check register 204 in greater detail, this register consists basically of 18 latches 306a to 306r. These latches produce the output signals PUNCH CHECK REGISTER 0 to PUNCH CHECK REGISTER 17 on lines 234a to 234r. The latches are loaded under the control of the punch emitter signals on lines 148a, 148b and 148c. These signals follow one another and occur once for each time that the emitter elements 138a pass the emitter 146, being provided by any suitable circuitry. These signals gate the state of the punch check crystals 156, which are indicated by the signals on lines 236a to 236r, into the latches 306a to 306r. The punch check data appears on output lines 234a to 234r, and this data is gated under control of the central processing unit A in series of 3 bytes into the processing unit A. This action is performed particularly by the gate 212, as will be hereinafter described in greater detail. Upon the last byte being gated into the central processing unit A, the DECODE 17 signal is raised on line 286q. After the signal EB INPUT TIME has been raised to gate the last byte of this data into the central processing unit A, the signal EB OUTPUT TIME on line 226a raises; and AND gate 310 will thus be satisfied for resetting all of the latches 306a to 306r. The latches 306a to 306r may then again be loaded at the next punch emitter time of interest.

Referring to the read register 206 in greater detail, particularly in connection with FIG. 9, the read register 206 functions in much the same manner as the punch check register 204. The read register 206 like the punch check register is made up basically of 18 latches, these being the latches 300a to 300r. Read register 206 is loaded at read count 1, read count 2 and read count 3, with these same signals being raised on lines 260, 258 and 256, with whatever information is contained on the read cell lines 118a to 118r at the time. The interpretive control program gates this information, which is contained on the output lines 238a to 238r into the central processing unit A in series of 3 bytes. In particular, this gating function is performed by the gates 210 and 212. As will be observed, the latches 300a to 300r are set when the corresponding AND circuits 302a to 302r are satisfied, and each of these AND circuits has as a READ COUNT signal and a READ CELL signal applied to it as inputs.

When the central processing unit A has received the last set of read data in this manner, AND gate 304 is satisfied, since both the signal DECODE 14 on line 286n and the signal EB OUTPUT TIME on line 226d are raised. The output of AND circuit 304 is applied to the reset side of each of the latches 300a to 300r, and these latches therefore are reset at this time. The latches 300a to 300r may again be set when the next group of holes 108 are over the read cells 110.

A more specific description of operation of the gates 210 and 212 shown in some detail in FIG. 7A to 7C will now be given. Certain information has previously been discussed in connection with other figures herein, this being read data and punch check data; and, in addition, interrupt status information is required by the control program of the central processing unit A. When the interpretive control program (in memory portion 28a) requires information to be gated from the attachment D into the central processing unit A, the control program makes use of the data control circuitry 200 and in particular of the decode 280, to select a group of AND gates in gate 212 which causes each of these AND gates to gate therethrough whichever other bit is applied to the AND gate, thereby to the connected OR gate 350 and to the DBI 58. More specifically, if the interpretive control program wishes to interrogate the status of interrupt level 1, it will output on DBO 54 information to raise the signal DECODE 8 (from decode 280) thus providing the signal LOAD INTERRUPT STATUS 1 on line 246a. This signal is applied to AND gate 352 a1. This allows whatever information is on the line 240a, carrying the signal INTERRUPT STATUS 1 BIT 0, to be gated through AND circuit 352a1 into OR gate 350a and to DBI bit 0 line 58a. Therefore, whatever information was on line 240a at this time is on line 58a, DBI bit 0. Similarly, the information on the lines corresponding to line 240a and carrying the bit 1, bit 2, bit 3, bit 4, bit 5, bit 6 and bit 7 information is gated through to DBI 58. The portion of the gate 212 for the bit 2 information is illustrated and includes the AND circuit 352c1, and gate 352c1 is satisfied by the LOAD INTERRUPT STATUS 1 signal on line 248a and by the INTERRUPT STATUS 1 BIT 2 signal on line 240a. Thus, AND gate 352c1 gates the signal INTERRUPT STATUS 1 BIT 2 on line 240c onto OR gate 350c and from thence on to DBI bit 2 line 58*c*. Similarly, the signal INTERRUPT STATUS 1 BIT 7 on line 240*h* is gated through AND circuit 352*h*1 and from thence through OR circuit 350*h* to DBI bit 7 line 58*h*. The INTERRUPT STATUS 1 BIT 0 to 7 signals are thus detected by the control program in memory portion 28*a*.

Similarly, when the control program in memory portion 28*a* wishes to examine INTERRUPT STATUS 2, INTERRUPT STATUS 3 and INTERRUPT STATUS 4, the same actions take place as with INTERRUPT STATUS 1. The illustrated AND circuits 352*a*2, 352*c*2 and 352*h*2 are effective for the INTERRUPT STATUS 2 signals; the illustrated AND circuits 352*a*3, 352*c*3 and 352*h*3 are effective for the status 3 signals; and the illustrated AND circuits 352*a*4, 352*c*4 and 352*h*4 are effective for the status 4 signals.

In order for the control program to examine read data from the read register 206, the central processing unit A outputs signals to the data control 200 and particularly to the DECODE 280 so as to raise a LOAD READ DATA signal on one of the lines 248*a* to 248*c*. For example, the DECODE 12 signal on line 286 may thus be raised which, at EB input time, provides the signal LOAD READ DATA 1 on line 248*a*. This signal is applied onto the OR gate 354*a*5 and from thence onto the AND gate 352*a*5. The reason for the OR gate 354*a*5 in this particular position because, during ICPL time, when the interpretive control program is being loaded into the memory portion 28*a*, there is no control to allow loading of this program. This function is taken care of by the ICPL COUNT 1 signal applied onto OR gate 354*a*5 by means of line 254*a*. The signal LOAD READ 1 on line 248*a*, passing through OR gate 354*a*5 enables the AND gate 352*a*5, allowing the AND gate 352*a*5 to pass the signal READ REGISTER 0 carried by line 238*a*. This signal is derived by the read register 206 and is thus applied onto the DBI bit 0 line 58*a* through the OR circuit 350*a*. Similarly, for all of the other DBI lines 58*b to 58h*, carrying the DBI signals bit 0 to bit 7, read data will be applied onto these lines 58*b* to 58*h*. As a further example, line 238*c* carrying the signal READ REGISTER 2, is anded with the output of OR gate 354*a*5 and carried by line 358 by means of the AND circuit 352*c*5. Thus the READ REGISTER 2 signal is applied onto the DBI bit 2 line 58*c*. Similarly, the other read signals from the read register 206 are gated onto DBI 58. The first 6 read signals are gated onto DBI 0 to DBI 5 lines 58*a*, to 58*e*; the second group of read signals are gated in a similar manner as explained above except that the LOAD READ 2 signal on line 248*b* is used for enabling the connecting AND circuit 352. For example, the AND circuit 352*c*6 allows the signal READ REGISTER 8 on line 238*i* to be applied onto the DBI bit 2 line 58*c*. For the last 6 read register data signals, the signal LOAD READ 3 on line 248*c* is used to enable the corresponding AND circuits to gate the read register signals. For example, the READ REGISTER 14 signal carried by line 238*o* is gated through the AND circuit 352*c*7 onto OR gate 350*c* and thereby onto the DBI bit 2 line 58*c*.

It will be noted that the OR gates 350*a* to 350*h* do not all have the same number of input signals. This is simply because there is not, with the attachment D, sufficient data to require that all of the OR gates have the same number of inputs. In particular, the OR GATES 350*a*, 350*b*, 350*g*, and 350*h* for bits 0, 1, 6 and 7 have a fewer number of inputs than the other OR gates 350. The OR gates 350*c* to 350*f*, for bits 2 to 5, are substantially the same and have the same number of inputs. It will be noted that the read data is put onto the OR gates 350*a* to 350*e* for bits 0 to 5, and the punch check data is put onto the OR circuits 350*c* to 350*h* for bits 2 to 7. This arrangement was used to more closely balance the number of inputs on the OR circuits 350.

Punch check data is gated onto DBI 58 in a manner similar to the read register data. For example, the LOAD PUNCH CHECK DATA 1 signal on line 244*a* from data control logic 200 enables AND gate 352*c*8 to gate the signal PUNCH CHECK 0 on line 234*a* to OR circuit 350*c* and thereby to DBI bit 2 line 58*c*. Similarly the signal LOAD PUNCH CHECK DATA 1 causes the PUNCH CHECK 1, PUNCH CHECK 2, PUNCH CHECK 3, PUNCH CHECK 4 and PUNCH CHECK 5 signals to be gated onto DBI bit 2 to DBI bit 7 lines 58*c* to 58*h*. The signal LOAD PUNCH CHECK DATA 2 carried by line 244*b* and LOAD PUNCH CHECK DATA 3 carried by line 244*c* are used to load PUNCH CHECK 6 to PUNCH CHECK 17 signals onto DBI 58, these PUNCH CHECK signals being carried by lines 234*g* to 234*r*.

The operation of the interrupt control logic 214 will now be described with reference to FIG. 6. The control 214 is the basic controller for the attachment D, allowing the control program in memory portion 28*a* to go back and allow processing of the customer's program in the customer's portion of memory 28 while overlapping I/O functions are occurring. In order to enable an interrupt, to allow a signal to be sensed by the central processing unit A, LOAD ALLOW INTERRUPT 1 to LOAD ALLOW INTERRUPT 4 signals are outputed by the central processing unit A these signals being respectively for interrupt levels 1, 2, 3 and 4. There are thus 8 interrupting signals per level or 32 signals as a total which can interrupt the processing by the central processing unit A, allowing the interpretive control program in memory portion 28*a* to process the requirements for data in and data out with respect to the I/O devices punch C and reader B. The LOAD ALLOW INTERRUPT signals are carried by lines 252*a* to 252*d*; however, since only the interrupt control logic for interrupt level 1 is illustrated in FIG. 6, the latter 3 signals do not show. As has been previously described, the logic for levels 2, 3 and 4 is exactly the same as that shown for level 1 in FIG. 6.

The LOAD ALLOW INTERRUPT signals are in particular derived from the data control logic 200. For example, the LOAD ALLOW INTERRUPT 1 signal is provided by the AND circuit 288*a* shown in FIG. 10 which has the DECODE 1 and EB OUTPUT TIME signals on lines 286*a* and 226*d* applied thereto. If the DBO BIT 0 signal is high at this time, this signal being on line 54*a*, latch 318*a* (see FIG. 6) will be set, since AND circuit 320*a* will be satisfied. If the DBO BIT 0 signal is low, latch 318*a* will either be reset after being previously set or no operation will occur. Similarly, the 7 other latches 318*b* to 318*h* may be set by the LOAD ALLOW INTERRUPT 1 signal. Similarly, the latches corresponding to the latches 318*a* to 318*h* in the circuitries for interrupt levels 2, 3 and 4 will be set in the same manner by the signals DBO BIT 0 to DBO BIT 7, with the LOAD ALLOW INTERRUPT 2, LOAD ALLOW INTERRUPT 3 and LOAD ALLOW INTERRUPT 4 signals respectively being high.

The DBI BIT 0 to DBI BIT 7 signals are thus used to set the corresponding latches 318a to 318h illustrated for interrupt level 1; and, once one of the latches 318 is set, this allows any particular I/O device signal to set the corresponding latch 312. As is apparent from FIG. 6, the particular latches 318a and 312a illustrated are associated with the reader B and the illustrated latches 312h and 318h are associated with the punch C; since the READ EMITTER signal on line 104 is applied eventually to the latch 312a while the PUNCH EMITTER signal on line 148 is applied eventually to the latch 312h.

The interrupt control logic 214 is only interested in the leading edge of the emitter signals, and the leading edge detectors 316a and 316h have thus been provided. This is for two reasons, namely, the physical signal itself may not be well defined; and secondly, once an emitter signal is accepted from an I/O device, another one should not be accepted until the first emitter signal has completely decayed.

As an example of the operation of the interrupt control 214 is the READ EMITTER signal on line 104 raises, being detected by the detector 316a, latch 312a will be set since AND circuit 314a is satisfied. It is assumed that latch 318a is set as previously described. Latch 312a produces the signal INTERRUPT STATUS 1 BIT 0 on line 240a, and this signal has two purposes. The first purpose is to set latch 328a which raises the signal INTERRUPT REQUEST 1 on line 242a, this being applied to the central processing unit A. At the end of the next instruction if no other higher order interrupt is requested, the central processing unit A will branch or trap to the previously loaded address in the memory 28 for this interrupt level. As the second purpose of the INTERRUPT STATUS 1 BIT 0 signal, the control program in memory portion 28a will then receive the signal INTERRUPT STATUS 1 BIT 0 and the other interrupt status signals carried by lines 240b to 240h to determine (by software) which of these signals caused the interrupt. The central processing unit A will then perform the necessary functions and will return to reload different allow interrupt signals on lines 252a to 252d to the interrupt controls 214.

When the central processing unit A first samples the interrupt latches 312, examining the signals INTERRUPT STATUS 1 BIT 0 to INTERRUPT STATUS 1 BIT 7, the same DECODE signal from decode 280 that gated in the status (DECODE 8 signal on the line 286h) is anded with the EB OUTPUT signal on line 226d by means of AND gate 330 and causes the latches 312a to 312h to be reset. Therefore, if an additional signal normally effective for setting one of the latches 312 is applied after the time the latches 312 are interrogated and until the time the latches 312 are released, the central processing unit A can sample these latches without releasing the interrupt due to this additional signal. The interrupt request latch 328a is reset when the next LOAD ALLOW INTERRUPT signal is received by the interrupt control logic 214, assuming that none of the latches 312 has been set between the time the latches were interrogated until the time the next LOAD ALLOW INTERRUPT signal is received. Latch 328a is a set dominant latch, so that the INTERRUPT REQUEST signal therefrom normally drops if no new interrupt request has been received after a previous time that status was sampled.

As has been mentioned, there is a priority between the various interrupt levels and this priority is inherently within the central processing unit A. Interrupt level 4 may take priority over interrupt level 3, with interrupt level 1 having the least priority, for example; and, in this case the READ EMITTER and PUNCH EMITTER signals on lines 104 and 148 respectively would be in the lowest priority group. Priority is also set up between the 8 signals corresponding to these two signals in any one of the interrupt levels 1, 2, 3 and 4. This is accomplished by the software that is used in connection with the central processing unit A and more particularly is a function of the manner in which the INTERRUPT STATUS signals are scanned by the central processing unit A.

The counter and decode 208 consists of a binary counter and the necessary logic to decode various counts from the counter. The counts therefrom have two purposes. During an initial controlled program load, the counts are used to turn on and off a start line of the central processing unit A. Also, during normal operation, the counts are used to load the read register 206, since the counter 208 is counting READ EMITTER pulses from line 104 which is synchronized with the progress of the card 106 across the light sensitive devices 110.

With respect to a number of additional control lines shown in FIGS. 3A and 3B, the "read cells dark" lines 264 is controlled by the large AND gate 222 to determine when a card 106 has entered the read station above the light sensitive devices 110. The run motor lines 96 and 144 allow the control program to turn the respective motors off and on to reduce noise when the motors are not needed for service, and any suitable logic may be provided for this purpose.

Figure 11A:
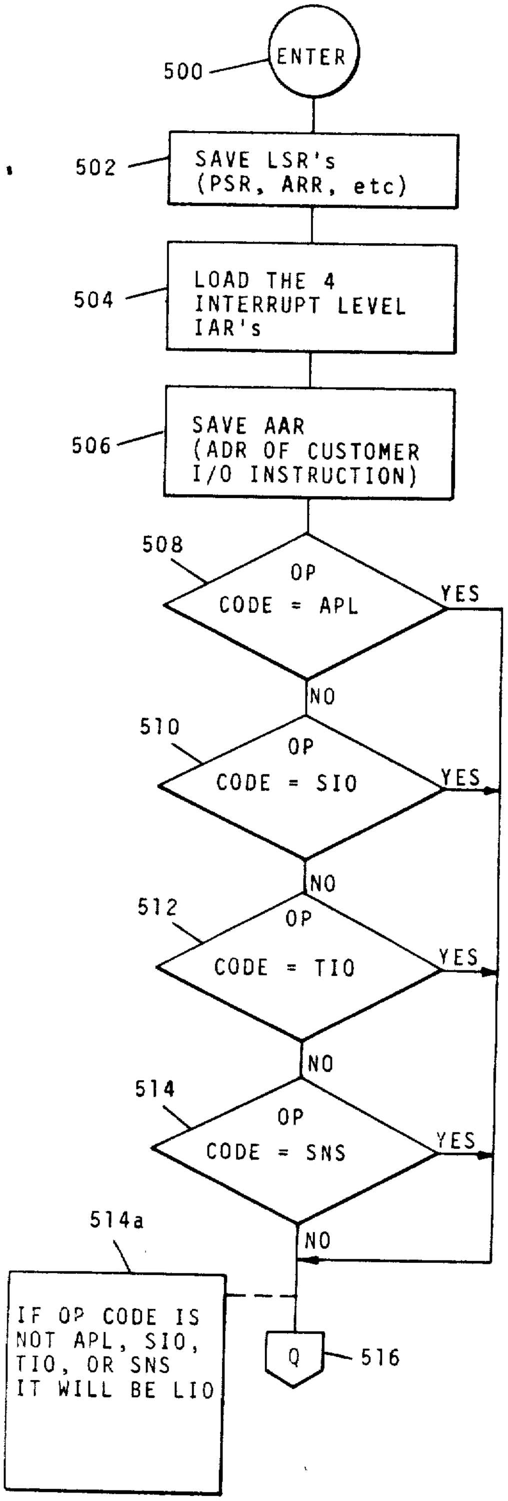
FIGS. 11A and 11B together illustrate schematically a subprogram, which is part of an exemplary program usable in connection with the attachment illustrated in the previous figures, the subprogram shown in FIGS. 11A and 11B particularly being the decode of a customer executed I/O instruction and Q code with a branch being made to one of eight subroutines.
Figure 11B:
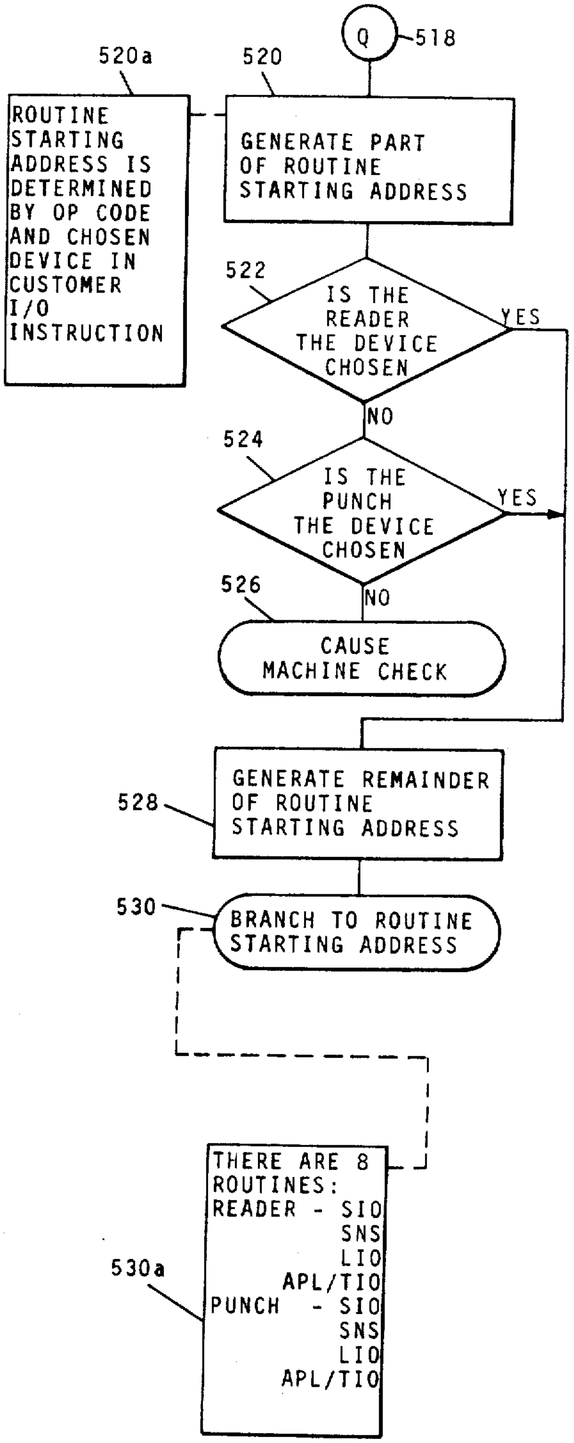
Figure 12:
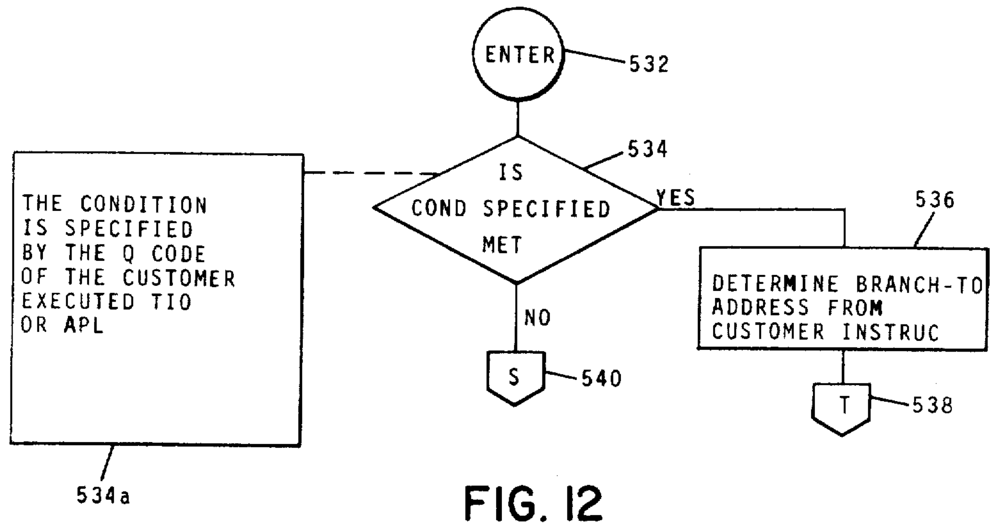
FIG. 12 shows schematically a reader TIO/APL subroutine, which is one of the eight subroutines.
Figure 13:
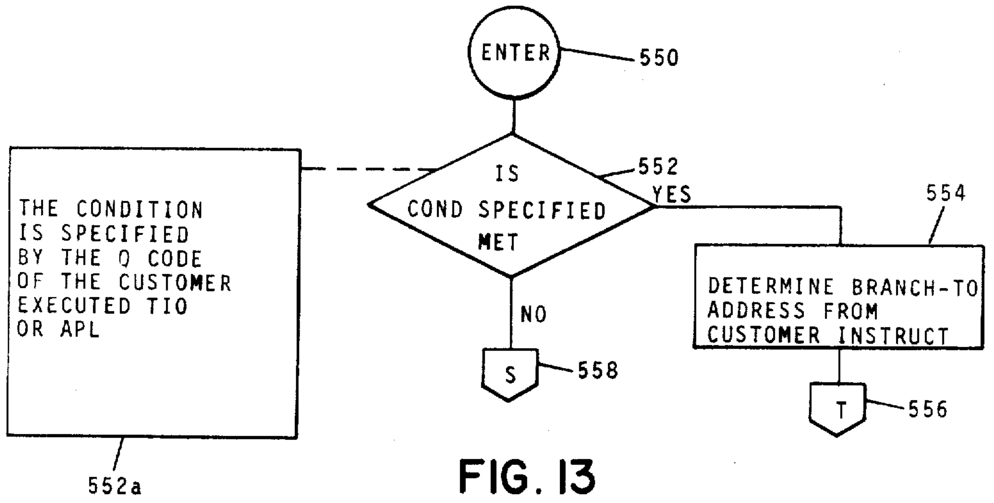
FIG. 13 shows a punch TIO/APL subroutine.
Figure 14:
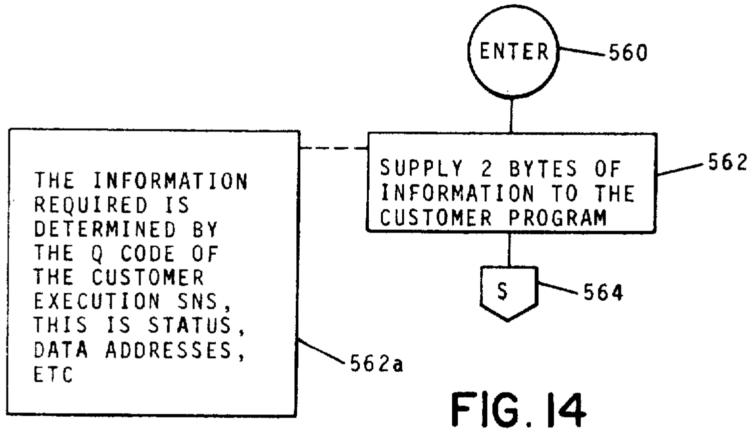
FIG. 14 shows a reader sense subroutine.
Figure 15:
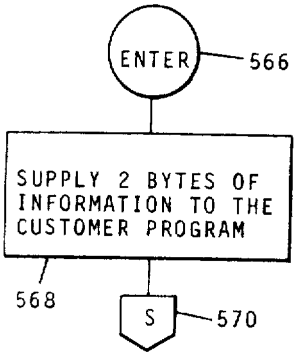
FIG. 15 shows a punch sense subroutine.
Figure 16:
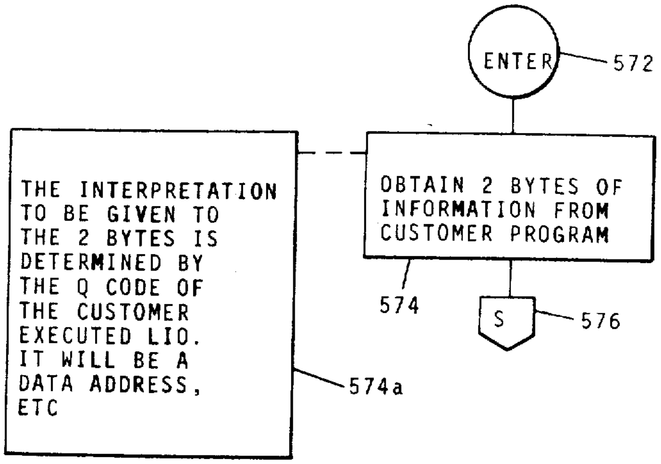
FIG. 16 shows a reader load I/O (LIO) subroutine.
Figures 17, 18:
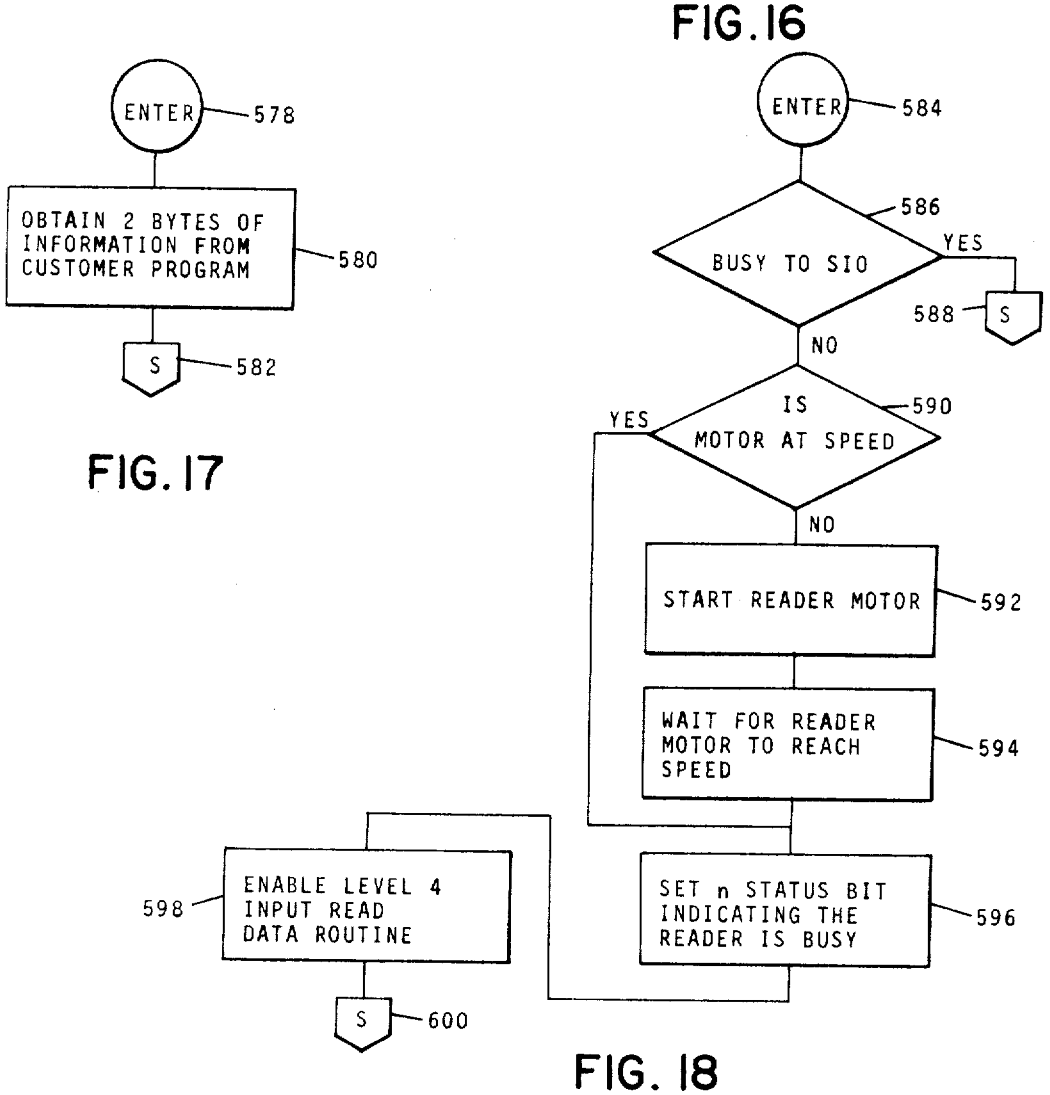
FIG. 17 shows a punch load I/O (LIO) subroutine.
FIG. 18 shows a reader SIO subroutine.
Figure 19:
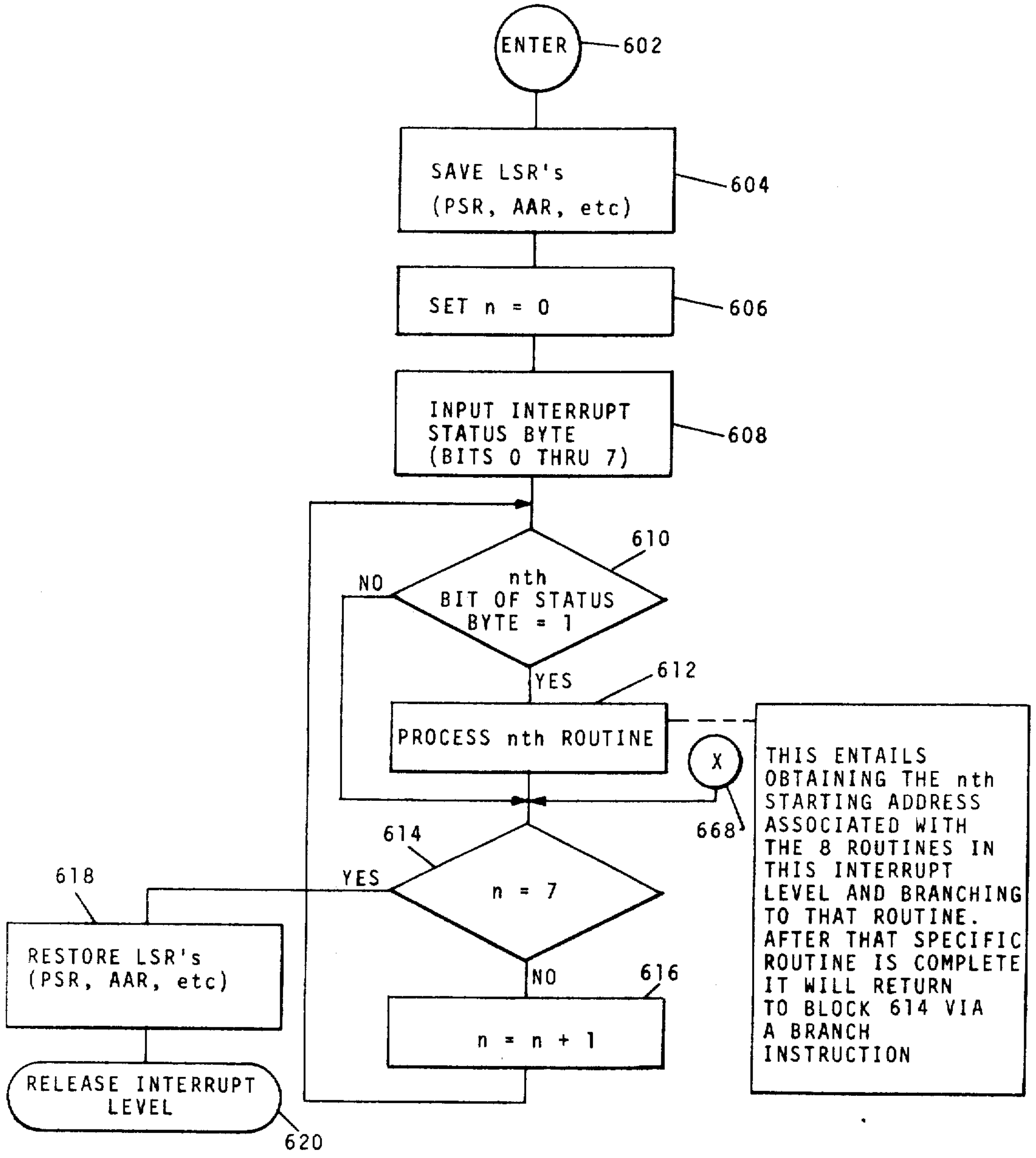
FIG. 19 shows a routine router subprogram for interrupt level 2.
Figure 20:
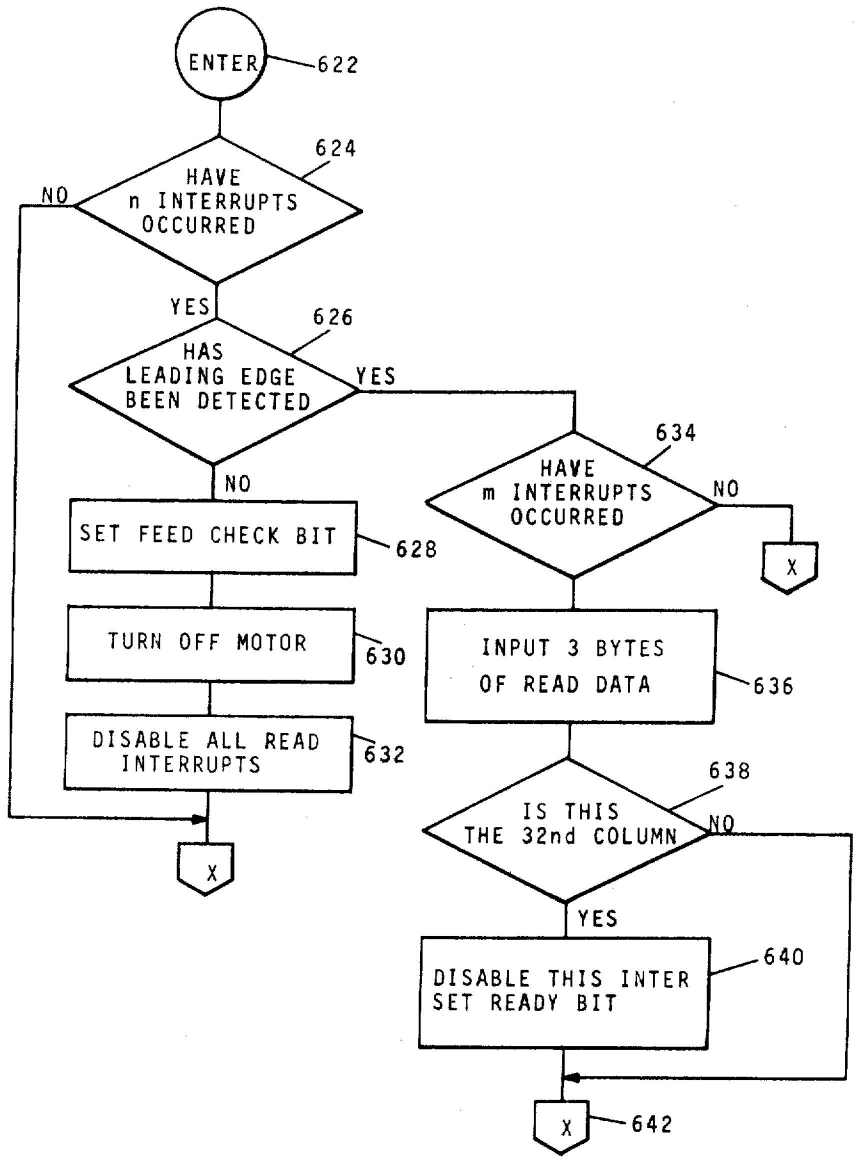
FIG. 20 shows an input emitter interrupt level 4 subroutine.
Figures 21, 23:
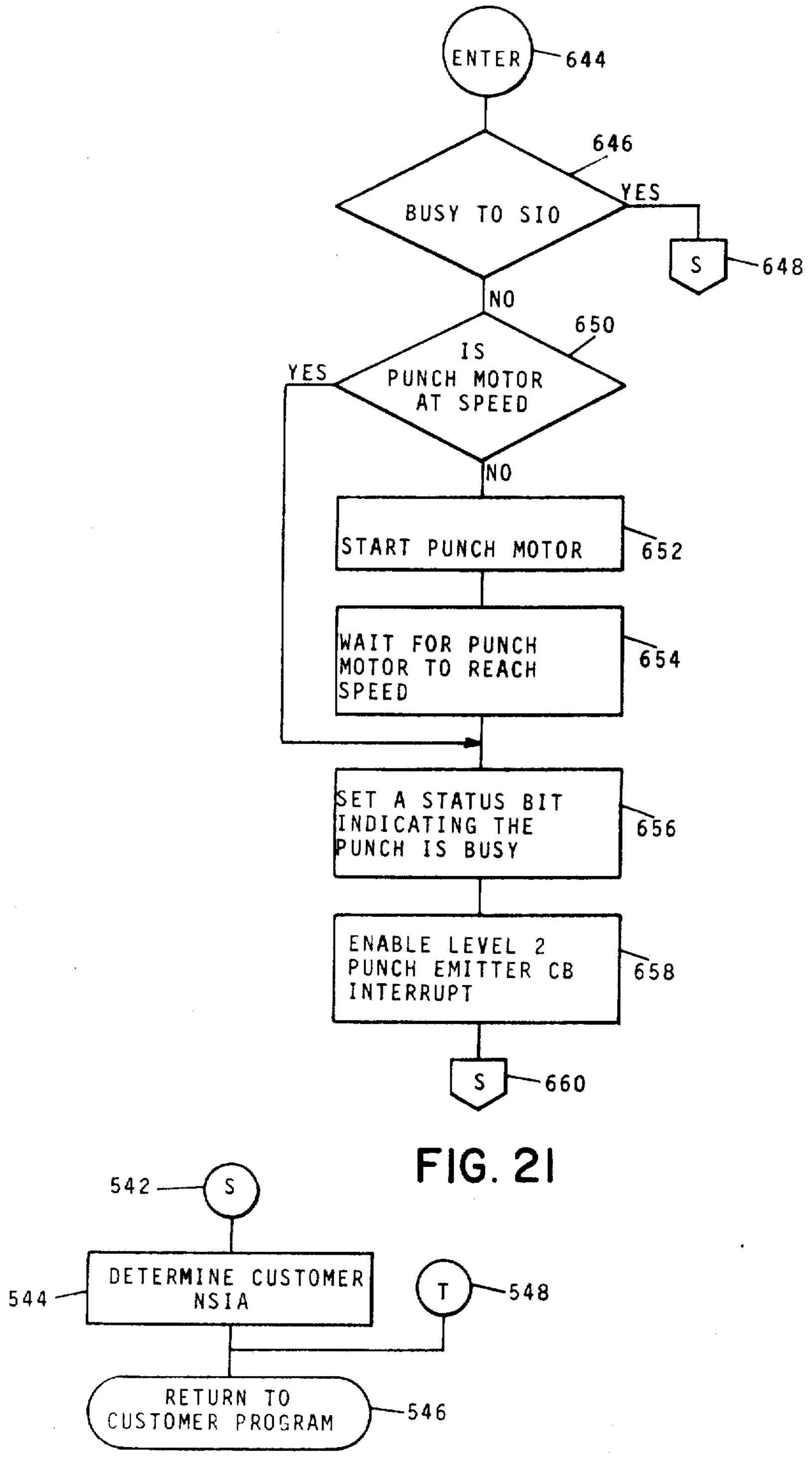
FIG. 21 shows a punch SIO subroutine.
FIG. 23 shows a subroutine for causing a return to the customer's program.
Figure 22A:
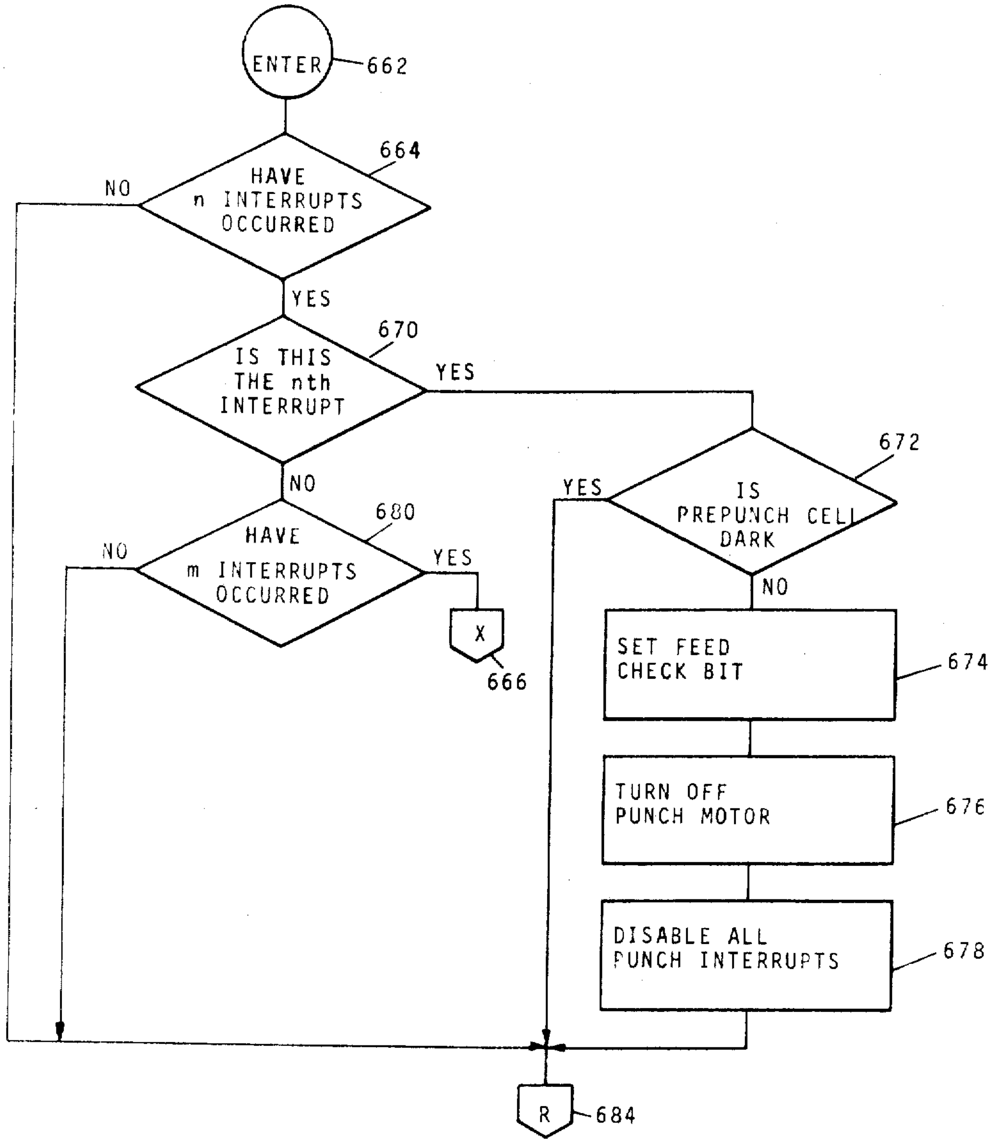
FIGS. 22A and 22B taken together show a punch emitter interrupt level 2 subroutine.
Figure 22B:
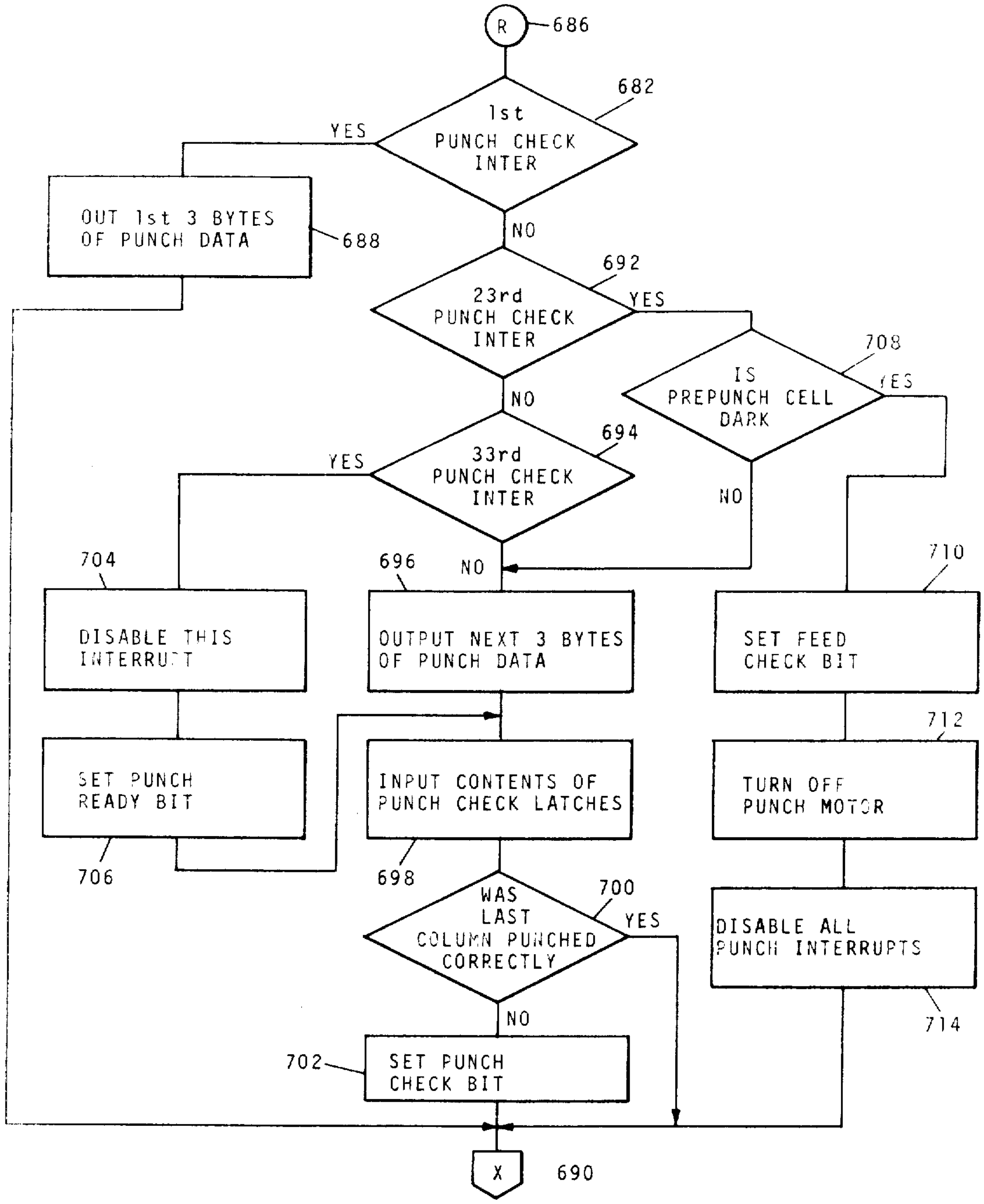

An exemplary program usable in conjunction with the central processing unit A, the attachment D, the punch C and the reader B is disclosed in connection with FIGS. 11A, 11B, 12, 13, 14, 15, 16, 17, 18, 19, 20, 21, 22A, 22B, and 23. The routine set forth in FIGS. 11A and 11B illustrates the decode of a customer executed I/O instruction and Q code, with a branch being made to one of 8 subroutines. These 8 subroutines are illustrated in FIGS. 12, 13, 14, 15, 16, 17, 18 and 21. FIG. 12 in particular shows a code that is executed as a result of the execution of a customer TIO or APL instruction for the reader B. FIG. 13 shows a code that is executed as a result of a customer executed TIO instruction for the punch C. FIG. 14 shows a code that is executed for a customer executed sense instruction for the reader B. FIG. 15 shows the code that is executed for a sense instruction for the punch C. FIG. 16 shows a code that is executed for a customer executed LIO (load I/O) instruction for the reader B. FIG. 17 shows a code that is executed for a customer executed LIO instruction for the punch C. FIG. 18 shows the code that is executed for a customer executed SIO (start I/O) instruction for the reader B. FIG. 19 shows the code that is executed as a result of an interrupt request for interrupt level 2, and this routine is duplicated 3 additional times, once for each of the other three interrupt levels. FIG. 20 shows the code that is executed as a result of a read emitter interrupt on level 4 and is concerned with checking for feed checks, that is, determining if a card 106 is proceeding along its path as required and also for inputting read data from the reader B. FIG. 21 shows the code that is executed as the result of an SIO instruction for the punch C. FIGS. 22A and 22B taken together show a routine for determining whether a card 106 is proceeding as required through the punch C, that is, determining if there is a feed check, also for outputting the punch data and for inputting the punch check data, that is, determining if there is a punch check. This involves a level 2 interrupt. FIG. 23 shows a routine for causing a return to the customer's or operating program.

The programs that are shown in FIGS. 11A and 11B, 19 and 23 are of the supervisory type, while the remainder of the programs as shown in the above mentioned figures are of a lower level type. The particular portions of the routine shown in FIGS. 11A and 11B that are supervisory are those portions that cause a decode of the customer executed SIO instruction and the Q code and branching to 1 of 8 subroutines; the decoding and branching particularly are the supervisory portions. FIG. 10 shows a supervisory routine in that this routine includes responding to an interrupt level and decoding to which one of 8 routines a branch should be made. As will be hereinafter more fully explained, when the programs as illustrated in these figures cause a return from a lower level program to a higher level program, a return is first made to a supervisory program from a lower level program and from thence to the customer's or operating program.

Now, considering the routines shown in these figures more in detail, it will be seen that the routine shown in FIGS. 11A and 11B includes the program steps or blocks **500, 502, 504, 506, 508, 510, 512, 514, 514*a*, 516, 518, 520, 520*a*, 522, 524, 526, 528, 530, and 530*a*. The code or routine illustrated in FIGS. 11A and 11B is executed immediately after the execution by the computer of a load I/O (LIO), test I/O (TIO) or APL, sense (SNS), or start I/O (SIO) instruction in the customer's program in memory 28. Entry into the routine shown in these figures is made as indicated by a block 500. Block 502 indicates that the contents of some of the local store registers 26 are saved, these local store registers including the program status register (PSR) address recall register (ARR), etc. Block 504 indicates that at this time, the four interrupt level instruction address registers in the LSR group 26 are loaded. The contents of these registers will be used later when an interrupt becomes pending. Block 506 indicates that the contents of the ARR in the local store register group 26 is saved. The ARR contains the address in memory 28 of the I/O instruction executed by the customer's program in memory 28**. At this time, the machine can now go to this address to determine which O*p* code should be executed and from the Q code determine which device (punch C or reader B) was requested. As the result of these decodes, the machine goes to one of 8 possible routines, these being the reader SIO (in FIG. 18), the reader sense (FIG. 14), reader LIO (FIG. 16) and reader APL/TIO (FIG. 12), punch SIO (FIG. 21), punch sense (FIG. 15), punch LIO (FIG. 17), and punch APL/TIO (FIG. 13). The selection of the various SIO, TIO, SNS, etc., instructions using the O*p* code is set forth in blocks 508, 510, 512 and 514.

The "Q" notation in blocks 516 and 518 indicates that the program shown in FIG. 11B is simply a continuation of that and a part of that shown in FIG. 11A. In order to determine whether the reader B or the punch C is involved, the starting address of the routine is generated as shown in block 520. As indicated by block **520*a***, the routine starting address is determined by the O*p* code and the chosen device by the I/O instruction in the customer's program. There are 8 of these routines as previously mentioned, and there are accordingly 8 starting addresses correspondingly. A branch is then made to the address calculated and to the corresponding one of the aforementioned routines. Blocks 522 and 524 are decision blocks indicating whether the punch C or the reader B is the chosen device, and the blocks 528 and 530 set forth the remainder of the routine for causing the branching mentioned.

FIG. 12 shown in some detail the reader TIO/APL subroutine, which is one of the 8 subroutines above mentioned. The FIG. 12 subroutine includes program blocks **532, 534, 534*a*, 536, 538 and 540. The block 532 is simply an entry block denoting the start of the subroutine. The Q code of the instruction executed by the customer's program in memory 28 now determines what condition is to be tested; and as a result of that condition, a return will be made back to the customer's program at the next sequential instruction address or to the branch to address. Block 534 of the FIG. 12 subroutine is the decision block, and the condition mentioned is specified by the Q code of the customer executed TIO or APL instruction. The condition, for example, could be the existence or non-existence of an error in reading or possibly whether or not the reader B is ready to accept a new command. As a result of the decision indicated in the block 534, assuming this to be answered "yes", instead of returning to the next instruction in the customer's program in memory 28 indicated by block 540, a branch will be made. Block 536 indicates that a branch to address in memory 28 will be determined, this being supplied by the TIO instruction in the customer's program. If a branch is to be made, block 538 indicates that instruction route; while, if no branch is being made, block 540** indicates the route.

FIG. 23 shows the completion of the sub-program and includes program block 542, 544, 546 and 548. The notation "S" and "T" in blocks 542 and 548, corresponding to the same notations in blocks 540 and 538, indicate the instruction flow from the subprogram of FIG. 12 to the subprogram of FIG. 23. If a branch is made as above described, the program flow is from block 536 to 546 indicating a return to the customer's program. If no branch is made as a result of the test made by decision block 534, the next sequential instruction address (NSIA) in the customer's program is determined according to block 544, and then a return is made to the customer's program as indicated by block 546.

The punch TIO/APL subprogram shown in FIG. 13 is basically the same as that shown for the reader shown in FIG. 12 and includes program blocks **550, 552, 552*a*, 554, 556 and 558. It should be pointed out, however, that a different condition is tested in the FIG. 13 sub-program than that tested by the FIG. 12 subprogram, but the condition tested is again determined by the Q code. The FIG. 13** subprogram also goes to the next sequential instruction address in the customer's program, if the condition is not met, or goes otherwise to the branch to address if the condition is met.

The reader sense subprogram shown in FIG. 14, includes program blocks **560, 562, 562*a* and 564. A sense instruction supplies information as to the status of the I/O device (punch C or reader B) to the customer's program in memory 28. In order to accomplish this with respect to the reader, the subprogram shown in FIG. 14 examines the Q code of the sense instruction executed by the customer's program, and this indicates which two bytes should be supplied. Such bytes could be data addresses or status, for example; indicating, if there was a read check. After these 2 bytes have been supplied as indicated by block 562 to the address supplied by the sense instruction in the customer's program, the program flow is again to block 542 of the FIG. 23 subroutine, with the subsequent program flow being as previously described in connection with FIG. 23.**

The punch sense subroutine shown in FIG. 15 includes program blocks 566, 568 and 570 and is basically the same as the reader sense subprogram shown in FIG. 14. Of course, in connection with the FIG. 15 subroutine, the punch area of memory 28 is involved rather than the read area of memory 28.

FIG. 16 shows the reader LIO subprogram and includes program blocks **572, 574, 574*a* and 576. As indicated in program block 574, two bytes of data are obtained from the customer's program; and this may be used, for example, as a data address in memory 28. The use that is to be made of this data is determined by the Q code of the customer's LIO instruction. These two bytes are then saved in the appropriate place in memory 28, and the FIG. 23** subroutine will then be in effect in the same manner as previously described.

The punch LIO subroutine shown in FIG. 17 is basically the same as the reader LIO subroutine shown in FIG. 16 and includes program blocks 578, 580 and 582. The FIG. 17 punch LIO subroutine functions substantially the same as described for the FIG. 16 reader subroutine.

The reader SIO subprogram shown in FIG. 18 includes the program blocks 584, 586, 588, 590, 592, 594, 596, 598 and 600. The reader SIO subprogram as shown in FIG. 18 will be effective if the customer's executed program instruction was an SIO instruction for the reader B. Block 586 indicates that the first step is a test made to determine if the reader B is busy, that is, if there is a card 106 at this time being read by the reader B. If this is indeed the case, control is returned by means of blocks 588 and 542 to the customer's executed I/O instruction; in effect looping on the customer SIO instruction, until the reader B becomes ready to accept the SIO instruction. If the reader is not busy to the SIO instruction, the decision is made as to whether the motor 92 is up to speed, as is indicated by program block 590. If the motor is not running, an output instruction is executed, causing the motor to be turned on, this being indicated by program block 592. As is indicated by block 594, then a wait is made for a predetermined period of time to allow the motor to reach speed. If the motor was at proper speed, program blocks 592 and 594 are bypassed.

According to block 596, a bit is set in memory 28 indicating that the reader B is busy. According to block 598, interrupt level 4 is enabled (caused by the read emitter signal on line 104) so as to cause a read data routine to be effective to read a card 106, and this is just prior to returning to the customer's program using the subroutine previously described in connection with FIG. 23. It is assumed that a card will feed through the reader B at this time.

The routine shown in FIG. 19 is entered when an interrupt request from the logic occurs. There are actually 4 of these routines, one for each of the 4 interrupt levels; and the routines for the 4 interrupt levels are the same. Interrupt level 4 takes precedence over interrupt level 3 which in turn takes precedence over interrupt level 2, with interrupt level 2 taking precedence over interrupt level 1. In any of the interrupt levels, there is an inherent priority between the 8 signals; and the routine shown on page 8, in effect, determines the precedence that the various signals in any one interrupt level take over the others. The routine is entered at program block 602; and, as is indicated by program block 604, the contents of the local store registers in block 26 is saved, these including the program status register, the address recall register, etc. Then, as indicated by program block 606, a pointer is set at 0 (in the interpretive program). At this time as indicated by program block 608, the program inputs an interrupt status byte (including bits 0 through 7), which contains information as to which of the 8 reasons for interrupt occurred at this time. According to decision block 610, a test is then made to determine if bit 0 of the interrupt status byte is on, this occurring during the first pass through the loop shown in FIG. 19. If bit 0 is on, this indicates that a routine should be processed pertaining to this cause for interrupt. On the other hand, if this bit 0 is off, the routine shown in FIG. 19 does the processing necessary and then is at the point in the program between blocks 612 and 614. According to program block 614, a test is made to determine if the program has looked at all 8 bits of the byte; if not, the program goes to the next bit as is shown by program block 616. Then, a determination is made whether or not this bit in the status byte is on. When all of the reasons for interrupt have been processed in this interrupt request, the LSR's 26 are then restored to their content as previously saved in memory 28 as is indicated by program block 618. Then, the interrupt level is released as indicated by block 620. The control then goes back to the customer's program or to a lower level of interrupt.

The routine shown in FIG. 20 is entered at program block 622 after an interrupt at level 4 was caused. This interrupt was enabled in the reader SIO routine. Assuming that the card 106 has been fed from the hopper of the reader, a certain number of interrupts (each occurring on a pulse from emitter 100) will be received before the leading edge of the card is expected to arrive under the light responsive device 110. These first *n* interrupts, as is indicated in the program block 624, do no processing but merely return control to program block 614 of the FIG. 19 routine. After these *n* interrupts have occurred, it is assumed that the leading edge of the card 106 is over the light sensitive devices 110 so, therefore, at program block 626, if no leading edge is detected, it is assumed that there is a feed check (that the card 106 has not moved as fast as it should, for example). Then, as indicated by block 628, a feed check bit is set, which can be sensed by a customer executed sense instruction. Then, as indicated by block 630, the motor 92 is turned off, and all read interrupts are disabled as indicated by block 632. The particular interrupt level is released as indicated by blocks 618 and 620 in the FIG. 19 routine.

Assuming the leading edge of the card 106 has arrived over the light responsive devices 110, several more interrupts are awaited as indicated by program block 634. The *m* number of interrupts indicated in block 634 are a predetermined number of interrupts, depending on the timing of the reader B, to cause the first column of holes 108 to arrive over the light responsive devices 110. When the first column of data on the card 106 reaches the light responsive devices 110, then an input instruction is accomplished according to program block 636. This inputs 3 bytes of read data and stores this data into the customer area of memory 28, and this is done for all 32 columns of holes in the card 106. After the 32nd column has been read, this fact is determined according to decision block 638, and then the interrupt is disabled according to program block 640. At this time, a bit is also set which can later be sensed to determine if the device B is ready to read another card 106 according to block 640. The program continues on from block 642.

There are incidentally 96 bytes of information that will eventually be inputted from a card 106, there being 3 bytes per column. Therefore, every time a new column of holes 108 moves over the light responsive devices 110, 3 bytes of data are inputted; and this is done 32 times for the 32 aligned columns of holes 108.

The punch operation is started by the routine shown in FIG. 21. The FIG. 21 routine is arrived at after a customer executed SIO instruction for the punch C. The program is entered at program block 644; and a decision is then made according to program block 646 whether the punch C is busy to an SIO instruction, particularly by a card being punched at the time in punch C. If a card 106*a* is presently being punched, the program returns the control to the customer's program through block 648 and then loops on the instruction until the card 106*a* is free of the punch area (out of alignment with the punches 150.)

If the machine is not busy to the SIO instruction, a test is then made as indicated by program block 650 to determine if the motor 142 is up to speed. If it is not up to speed, according to program block 652, the motor 142 is started. Then, a wait occurs for a certain period of time as indicated by block 654 for the motor to reach speed. Then, a status bit is set indicating that the punch C is now busy, as indicated by program block 656. In effect, this is the bit that was tested at program block 646. Then, according to program block 658, the level 2 interrupts are then enabled, this being under the control of the punch emitter 146. Then, a return is made to the customer's program through block 660.

FIGS. 22A and 22B show the punch stepper interrupt routine (on level 2). This routine was enabled by the punch SIO routine shown in FIG. 21. It is assumed that the card 106*a* is fed from the hopper of the punch C and that it will require a certain number of interrupts (each generated by a pulse from emitter 164) for the card to cover the prepunch cell 162. For the first *n* interrupts, nothing occurs except that the interrupt levels are released. This is indicated by program blocks 664 and 666, the latter being connected with block 668 on FIG. 19. At the *n*th interrupt, an examination is made of the condition of the prepunch cell 162 as is indicated by program blocks 670 and 672. If the cell 162 is not dark at this time, it is assumed that the card 106*a* has not fed properly; and a feed check indication will be set, and the motor 142 will be turned off. This is indicated by program blocks 674 and 676. All punch interrupts will be disabled at this time as indicated by block 678.

If the prepunch cell 162 is dark at this time according to decision block 672, the interrupt level is released at this time. Several interrupts after this time, it will be assumed that the card 106 now has column 1 in alignment with the punches 150. According to decision block 680, entry will be made at this time to decision block 682 on FIG. 22B, through blocks 684 and 686. According to decision block 682, a determination is made whether this is the first column of data. If so, 3 bytes of data are outputted which are punched by punch C into card column 1. This is set forth by program block 688. Then, the interrupt levels will be released, passing through block 690.

At each subsequent interrupt on this level, passing through decision blocks 692 and 694, the next 3 bytes of punched data will be outputted as indicated by block 696. Then, the contents of the punch check register 204 are inputted as indicated by block 698; and, thereafter, according to decision block 700, a determination is made as to whether the last column was punched correctly. This is determined by comparing the contents of the punch check register with the data that was outputted originally for punching. If there is a non-compare, a punch check bit is set as indicated by block 702.

After the last column has been punched, only a check is made to determine if there was a punch check on the 32nd column. The interrupts are disabled at this column, and a bit is then set (in this interpretive program) that indicates that the punch is now ready to accept the next SIO instruction. This is indicated by blocks 704 and 706. Then, the interrupt level is released, passing through block 690.

At the 23rd column of the card 106 passing over the punches 150, the prepunch cell 162 should have gone light. If it has not at that time, it is assumed that the card 106 is not moving at the proper speed. Therefore, according to block 708 and block 710, a feed check bit is set. Thereupon, the punch motor 142 will be turned off, and all punch interrupts will be disabled, this being indicated by blocks 712 and 714.

As has been above explained, the contents of memory portion 28*a* are used for controlling the I/O devices B and C. Initially, however, this portion of memory as well as the other portions of it, are vacant; and it is thus necessary to somehow load the I/O control programs into the memory portion 28*a*. This may be done by the so called"CE switches" 416 (the switches used by the customer engineer or repairmen in adjusting and repairing the machine). For this, the customer or customer engineer would put the processor in alter storage mode using a signal on line 384. This would have the effect of providing the alter storage mode signal in line 382 from OR circuit 380 and would also be effective on the system so that the customer engineer could dial in the bits from switches 416 into storage 28. This procedure, however, would be most time consuming; and the system has therefore been provided with the ICPL (initial control program load) switch 380 and associated circuitry whereby, even though there is no control program of any type in memory 28 for controlling the reader B, nevertheless the reader B can be used to load such a program into memory.

In effect, the illustrated circuitry changes the effect from mechanically setting switches for program loading into electronic pulses coming from the ICPL control logic and particularly from the counter and decode 208. These signals (in lines 254*a*, 254*b* and 254*c*) derived of the counter and decode 208 would be the same as those which the customer engineer would supply by successively closing the CPU start switch 402 in manually entering a program. Then, as each card 106 passes through the read station of the reader B, data is read off of the card and is stored in the storage portion 28*a*. The information from the document card 106 is transferred through the gate 212 and OR gate 210 to the central processing unit A and also passes through lines which are ored (by OR circuits 406 to 406*h*) with the outputs of the CE switches, these lines having been degated by AND gates 410*a* and 410*h* and the corresponding AND gates for the other DBI bits. To the central processing unit A, it appears as though the customer engineer is continually pressing the CPU start key 402 while in the alter storage mode, and continually changing the CE switches 416 between depressions of the start key 402.

More specifically, in order to use the ICPL (Initial Control Program Load) function, the reader B is made ready and the ICPL switch 380 is closed. This initiates a normal reading operation by the reader B. As the cards 106 come into the read station of the reader B, the data collected by the read cells 110 is stored in latches 300, and the counter and decode 208 is initiated on detecting (by the signal Read Cells Data on line 264) the leading edge of the card 106 as it passes through the transport of the reader to the read cells 110. The counter 208, after three bytes of data have been read off the card 106, provides these three bytes of data from the read register 206 to the central processing unit A. The central processing unit A is so arranged that this data appears to the unit A the same as data from the CE switches 416, and this data is then loaded into memory 28 in the same manner as if it were derived from the switches 416.

In this operation, the counter 208 dates the raw read cell data into the latch 300*a* and corresponding latches of the read register 206, and the contents of latch 200*a* and the other latches of the read register 206 are gated onto the DBI 58 by the signals in line 260 and corresponding lines for the other latches in reach register 206 derived from the counter 208. During this operation, the processor is in alter storage mode in which it automatically steps one memory cycle for each time that the start switch 402 is depressed. For each of the signals from the read register 206, it appears to the central processing unit A that the start switch 402 has been depressed once, even though this has not actually occurred.

There are 3 bytes of data read from 3 aligned columns of a card 106 by the reader B. These 3 columns correspond with 3 bytes of data, and these bytes of data are transmitted from the read cells 110 sequentially to the memory portion 28*a*. First the bytes of data are transmitted sequentially into the read register 206 from the reader B in accordance with 3 successive pulses on lines 256, 258 and 260, respectively. Subsequently, these 3 bytes of data are loaded sequentially from the read register 206 into the memory portion 28*a* by 3 sequential pulses on lines 254, these being the pulses particularly on lines 254*a*, 254*b* and 254*c*.

The alter storage switch which supplies the signal "CE alter storage switch" on line 384 is normally operated by the customer engineer; however, in ICPL mode, the same output signal is provided on line 378 from the ICPL switch 380 which is closed at this time. At the same time, due to the action of the inverter 386, the processor run switch signal on line 390 is in effect degated so that no PROCESSOR RUN signal exists on line 390. Thus, during this operation in alter storage mode, the "CPU start key" signal on line 398 is provided from the counter 208 (through ICPL line 262), and this signal causes a loading of data from the reader B to memory 28. At this time, the outputs on lines 414*a*, 414*b*, etc. from the CE switch 416 are degated by the AND circuits 410*a* to 410*b*. Instead, the data on data bus in 58 from the read register 206 is loaded into the memory 28.

As a card 106 is being read by the reader C as above described, an ICPL signal is raised on line 262 by closure of the ICPL switch 380. This signal impressed on counter and decode 208 is effective to start the counter and decode 208. This generates 3 ICPL counts; ICPL count 1, line 254*a;* ICPL count 2, line 254*b;* and ICPL count 3, lines 254*c*. These occur one after the other. These ICPL counts are used to gate the data from the 3 read registers (one register being made up of latches 300*a* – 300*f*, a second register being made up of latches 300*g* – 300*l*, and the third register being made up of latches 300*m* – 300*r*) to the gate 212. In particular, this data goes through the AND circuits 352 that have inputs from the OR circuits 354*a*5, 354*a*6 and 354*a*7. This data then proceeds through the OR circuits 350*a* – 350*h* to DBI 58 and finally to the central processing unit A and the memory portion 28a. During this operation, the output signal from the ICPL switch 380 is applied onto the line 98 which has the effect of causing the reader motor 92 to run.

In order to stop the card reading, the operator simply releases the ICPL switch 380.

To recapitulate, it is apparent that the amount of hardware in the attachment D has been minimized while the interpretive mode program located in the memory portion 28*a* has been substituted to take over the functions formerly performed in attachment hardware, such as in the IBM System/3. The attachment D includes in its hardware the punch register 202, the punch check register 204 and the read register 206 which in effect constitute extensions of the memory 28 of the central processing unit A for holding information which is either on its way to the central processing unit from the I/O devices or vice versa. The interrupt control 214 advantageously allows interpretive control program in the memory portion 28*a* freedom from having to continuously monitor or poll the status of the I/O devices. In particular, whenever new information if not required to be transferred from or to the I/O devices B and C, the interpretive program will release control back to the customer's program so that it can process data in the same type of operation as is presently done in the IBM System/3. The additional logic of the counter and decode 208 is principally for the initial leading of the data read by the reader B into the portion 28*a* of the memory 28 (the interpretive control program).

Thus, the basic components of the attachment D are the registers 202, 204, and 206 holding data which is being passed in one direction or the other through the attachment D, and preferably, in addition, the interrupt control logic 214. The logic makes unnecessary the continuous polling of the I/O devices because the emitter signals (on lines 104, 148, etc.) are applied on to and control the interrupt logic 214). The other functions usually accomplished by an attachment between the central processing unit and I/O devices that are taken over by the interpretive mode control program in memory portion 28a, when the I/O devices require servicing are the following: the interpretive mode program in memory portion 28a includes program steps to first translate the I/O commands of the customer's program; secondly, to initialize the interrupt level and start the processing of an I/O transaction; thirdly, to keep track of the progress of the I/O devices, particularly the progress of the card 106 passing through the devices and to supply the I/O devices with any information required to complete the operation, and finally to sense when the operation is completed and inform the customer's program of the fact. The instructions used for attachment D with the interpretive mode program in memory portion 28a are exactly the same as that used in the IBM System/3 with the exception that two new instructions have been added, namely, I/O input and I/O output. These two new instructions cause the actual transfer of data from the memory 28 to the attachment D and vice versa. The customer I/O instructions cannot transfer data by themselves to the I/O devices, but these instructions rather cause the transfer of a command to the interpretive control program in the memory portion 28a, and this program in turn transfers the data using the I/O input and the I/O output instructions.

What is claimed is:

1. A calculating system comprising:

a central processing unit, an input-output unit for receiving data from or providing data to said central processing unit and having a data carrying record traveling through the input-output unit, and an attachment connecting said input-output unit with said central processing unit, said central processing unit including an arithmetic and logic unit, a memory and a plurality of temporary storage registers connected with the memory and arithmetic and logic unit so that data in said memory may be processed by the central processing unit in accordance with programs contained in said memory, said input-output unit including an indicator device providing output signals indicative of changing positions of the data carrying record in the input-output unit, said memory including a part having fixed programs therein and said attachment being arranged to cause said fixed programs to be operative under the control of said signals from said indicator device so that the fixed programs cooperate with the rest of the central processing unit to count said signals to thus indicate the position of the data carrying record in said input-output unit.

2. A calculating system as set forth in claim 1 and including another input-output unit for receiving data from or providing data to said central processing unit and having a data carrying record traveling through the unit, said fixed programs being such and cooperating with the rest of said central processing unit in such a manner as to translate an I/O command in another part of said memory and apply it to said fixed programs so as to thereby cause the attachment to distinguish between one of said input-output units and the other of said input-output units.

3. A calculating system as set forth in claim 1, said fixed programs being such as to cooperate with the rest of the central processing unit to make a determination and provide an output signal when said counting has progressed to a pre-determined number of counts.

4. A calculating system as set forth in claim 1, said fixed programs in said memory part being such as to cooperate with the rest of the central processing unit to make a determination and provide an output signal when the counting of said signals by said fixed programs cooperating with the rest of the central processing unit has progressed to a predetermined number of counts and being such as to cooperate with the rest of said central processsing unit so as to indicate the completion of the processing of a data carrying record by said input-output unit when said counting has progressed to said predetermined number of counts.

5. A calculating system as set forth in claim 1, said attachment including means under the control of output signals from said indicator device to make an interrupt of the processing of data by said central processing unit on the reception of one of said output signals.

6. A calculating system as set forth in claim 5, said input-output unit including a reader for reading data from a document card traveling through the reader and said attachment including means for transferring data from the reader to said central processing unit on the existence of said interrupt of the processing of data.

7. A calculating system as set forth in claim 5, said input-output unit including a punching machine for punching a document card traveling through the punching machine, said attachment including means for transferring data from said central processing unit to said punching machine on the existence of said interrupt of the processing of data.

8. A calculating system as set forth in claim 5, said input-output unit including a reader for reading a punched document card traveling through the reader and said attachment including means for transferring data from the reader to said central processing unit on the existence of said interrupt of the processing of data and including a read register for temporarily storing the data read by said reader from a punched document card prior to passage of the information to said central processing unit.

9. A calculating system as set forth in claim 5, said input-output unit including a punching machine for punching data indicating openings in a document card traveling through the machine, and said attachment including means for transferring data from said central processing unit to said punching machine on the existence of said interrupt of the processing of data and including a punch register for temporarily storing data from said central processing unit to be punched by said punching machine into a document card.

10. A calculating system as set forth in claim 5, said input-output unit including a second indicator device providing an output signal when said data carrying record has reached a certain point in traveling through the input-output unit and the attachment including means under control of said last named output signal to thereafter transfer data between said input-output unit and said central processing unit on the existence of said interrupt of the processing of data.

* * * * *